(12) United States Patent  
Plow et al.

(10) Patent No.: US 8,719,728 B2  
(45) Date of Patent: May 6, 2014

(54) MULTICAST FILE VIEWING AND EDITING

(75) Inventors: Gregory M. Plow, Poulsbo, WA (US); Farrokh E. Pourmirzaie, San Jose, CA (US); Kevin M. McBride, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 518 days.

(21) Appl. No.: 12/566,641

(22) Filed: Sep. 24, 2009

(65) Prior Publication Data

US 2010/0017751 A1 Jan. 21, 2010

Related U.S. Application Data

(62) Division of application No. 10/817,681, filed on Apr. 2, 2004, now Pat. No. 8,276,096.

(51) Int. Cl.  
*G06F 3/048* (2013.01)

(52) U.S. Cl.  
USPC ............................................ 715/804; 715/781

(58) Field of Classification Search  
USPC ................... 715/804, 229, 746, 781  
See application file for complete search history.

(56) References Cited

U.S. PATENT DOCUMENTS

| | | | |
|---|---|---|---|
| 4,785,296 A | | 11/1988 | Tabata et al. |
| 4,975,690 A | * | 12/1990 | Torres ........................... 715/856 |
| 5,065,347 A | | 11/1991 | Pajak et al. |
| 5,121,478 A | | 6/1992 | Rao |
| 5,287,521 A | | 2/1994 | Nitta et al. |
| 5,349,658 A | | 9/1994 | O'Rourke et al. |
| 5,369,739 A | * | 11/1994 | Akeley .......................... 345/626 |
| 5,371,847 A | | 12/1994 | Hargrove |
| 5,377,317 A | | 12/1994 | Bates et al. |
| 5,392,400 A | * | 2/1995 | Berkowitz et al. ............. 709/203 |
| 5,394,521 A | | 2/1995 | Henderson et al. |
| 5,438,661 A | * | 8/1995 | Ogawa .......................... 715/804 |
| 5,442,795 A | * | 8/1995 | Levine et al. ................. 715/775 |
| 5,448,695 A | | 9/1995 | Douglas et al. |

(Continued)

FOREIGN PATENT DOCUMENTS

WO 0107996 A1 2/2001

OTHER PUBLICATIONS

Non Final Office Action of Oct. 17, 2011 for U.S. Appl. No. 10/817,681 <26 pages>.

(Continued)

*Primary Examiner* — Phenuel Salomon  
(74) *Attorney, Agent, or Firm* — Janet M. Skafar; Ingrid M. Foerster

(57) ABSTRACT

Various embodiments of a method, apparatus and computer readable storage medium are disclosed. An application displays a portion of a unit of information in a first window on a display, and another portion of the unit of information in a second window on the display. The first and second windows are concurrently displayed on the display. The application closes the second window on the display. The closing inserts an indicator representing the second window into the unit of information and removes the second window from the display. The unit of information does not comprise the indicator prior to closing. In response to an interaction involving the indicator, the application redisplays another portion of the unit of information in a third window on the display. The first window and the third window are concurrently displayed on the display. Prior to redisplaying, the indicator is displayed in the first window.

20 Claims, 15 Drawing Sheets

(56) References Cited

U.S. PATENT DOCUMENTS

| | | | |
|---|---|---|---|
| 5,479,599 A * | 12/1995 | Rockwell et al. | 715/837 |
| 5,499,334 A | 3/1996 | Staab | |
| 5,526,524 A | 6/1996 | Madduri | |
| 5,564,002 A * | 10/1996 | Brown | 715/778 |
| 5,572,649 A * | 11/1996 | Elliott et al. | 715/788 |
| 5,649,186 A | 7/1997 | Ferguson | |
| 5,657,463 A | 8/1997 | Bingham | |
| 5,694,561 A * | 12/1997 | Malamud et al. | 715/805 |
| 5,742,778 A * | 4/1998 | Hao et al. | 715/759 |
| 5,844,553 A | 12/1998 | Hao et al. | |
| 5,850,396 A | 12/1998 | Gilbert | |
| 5,920,315 A | 7/1999 | Santos-Gomez | |
| 5,959,625 A * | 9/1999 | Betrisey et al. | 715/766 |
| 6,023,714 A | 2/2000 | Hill et al. | |
| 6,061,697 A * | 5/2000 | Nakao | 715/229 |
| 6,085,191 A | 7/2000 | Fisher et al. | |
| 6,182,115 B1 * | 1/2001 | Cuomo et al. | 709/204 |
| 6,201,548 B1 | 3/2001 | Cariffe et al. | |
| 6,310,631 B1 | 10/2001 | Cecco et al. | |
| 6,351,467 B1 | 2/2002 | Dillon | |
| 6,397,228 B1 | 5/2002 | Lamburt et al. | |
| 6,460,018 B1 | 10/2002 | Kasai et al. | |
| 6,460,108 B1 | 10/2002 | McCoskey et al. | |
| 6,499,040 B1 | 12/2002 | Vu et al. | |
| 6,529,905 B1 | 3/2003 | Bray et al. | |
| 6,573,907 B1 | 6/2003 | Madrane | |
| 6,616,702 B1 * | 9/2003 | Tonkin | 715/209 |
| 6,630,946 B2 | 10/2003 | Elliott et al. | |
| 6,631,386 B1 | 10/2003 | Arun et al. | |
| 6,687,878 B1 | 2/2004 | Eintracht et al. | |
| 6,877,135 B1 | 4/2005 | Kamiwada et al. | |
| 7,203,901 B2 * | 4/2007 | Chen et al. | 715/205 |
| 7,203,909 B1 * | 4/2007 | Horvitz et al. | 715/765 |
| 7,359,955 B2 | 4/2008 | Menon et al. | |
| 7,404,014 B2 | 7/2008 | Mairs et al. | |
| 7,530,022 B2 | 5/2009 | Ben-Shachar et al. | |
| 7,714,878 B2 * | 5/2010 | Gabay et al. | 345/626 |
| 7,716,597 B2 | 5/2010 | Plow et al. | |
| 8,276,096 B2 | 9/2012 | Plow et al. | |
| 2002/0019817 A1 * | 2/2002 | Matsui et al. | 707/1 |
| 2002/0065848 A1 * | 5/2002 | Walker et al. | 707/511 |
| 2002/0124099 A1 | 9/2002 | Srinivasan et al. | |
| 2002/0169795 A1 * | 11/2002 | Elliott et al. | 707/500 |
| 2002/0191028 A1 | 12/2002 | Senechalle et al. | |
| 2003/0065640 A1 | 4/2003 | Ough et al. | |
| 2004/0015536 A1 | 1/2004 | Cohen et al. | |
| 2005/0027757 A1 | 2/2005 | Kiessig et al. | |
| 2005/0097441 A1 | 5/2005 | Herbach et al. | |
| 2005/0102628 A1 * | 5/2005 | Salesin et al. | 715/764 |
| 2006/0075019 A1 | 4/2006 | Donovan et al. | |

OTHER PUBLICATIONS

Final Office Action of May 10, 2011 for U.S. Appl. No. 10/817,681. <26 pages>.

Search report dated Aug. 5, 2010 for Taiwan Invention Patent Application No. 094110452/SVL920040014TW1.

Non-Final Office Action for U.S. Appl. No. 10/817,681 having a notification date of Jul. 12, 2010 <22 pages>.

Weverka and Reid, "Word 2000: The Complete Reference," pp. 59-70, 118-121, 1999.

Mansfield, "Mastering Word 97," Fourth Edition, pp. 54-59, 1997.

Chu, Qiao and Nahrstedt, "A Secure Multicast Protocol with Copyright Protection," ACM SIGCOMM Computer Communications Review, vol. 32, No. 2, Apr. 2002, pp. 42-60.

Hac and Lu, "Architecture, Design and Implementation of a Multimedia Conference System," International Journal of Network Management, vol. 7, 1997, pp. 64-83.

Newman-Wolfe and Pelimuhandiram, "MACE: A Fine Grained Concurrent Editor," Proceedings of the Conference on Organizational Computing Systems, Nov. 1991, pp. 240-254, ACM Press.

Chang, Gong, Dollar, Gajiwala, Lee and Wear, "On Computer Supported Collaborative Writing Tools for Distributed Environments," Proceedings of the 1995 ACM 23rd annual conference on Computer science, 1995, pp. 222-229.

Pacull, Sandoz and Schiper, "Duplex: A Distributed Collaborative Editing Environment in Large Scale," Proceedings of the 1994 ACM conference on Computer supported cooperative work, 1994, pp. 165-173.

Swierk, Kiciman, Williams, Fukushima, Yoshida, Laviano and Baker, "The Roma Personal Metadata Service," Mobile Networks and Applications 7, pp. 407-418, 2002, Kluwer Academic Publishers.

Patel and Sahibuddin, "Reliable Multicast Service with IPv6 Support: Synchronous Collaborative Applications," 2002 Student Conference on Research and Development SCOReD2002, Proceedings. Globalizing Research and Development in Electrical and Electronics Engineering, Jul. 2002, pp. 468-471, IEEE.

Akrout, Gordon, Palisson, Proust and Goutte, "StreamWorks: the Live and On-Demand Audio/Video Server and its applications in Medical information systems," Proceedings of the SPIE, the International Society for Optical Engineering, vol. 2711, Feb. 1996, pp. 543-552.

Research Disclosure 432, "Shared cipher spec protocol," Apr. 2000, Article No. 173, pp. 776-777, Disclosed by International Business Machines Corporation, Kenneth Mason Publications Ltd, England.

Office Action mailed on Apr. 18, 2007 for U.S. Appl. No. 10/817,681, non-final rejection. <12 pages>.

Response to Office Action filed on Apr. 18, 2007 for U.S. Appl. No. 10/817,681. <23 pages>.

Office Action mailed on Jan. 9, 2008 for U.S. Appl. No. 10/817,681, non-final rejection. <8 pages>.

Final Office Action of Jul. 9, 2008 for U.S. Appl. No. 10/817,681, non-final rejection. <10 pages>.

Office Action of Jan. 7, 2009 for U.S. Appl. No. 10/817,681, non-final rejection. <15 pages>.

Notice of Allowance of Apr. 3, 2012 for U.S. Appl. No. 10/817,681 <19 pages>.

Non final Office Action of Mar. 15, 2012 for U.S. Appl. No. 12/566,654 <6 pages>.

Final Office Action of Sep. 12, 2012 for U.S. Appl. No. 12/566,654 <11 pages>.

Non-Final Office Action of Jan. 7, 2013 for U.S. Appl. No. 12/566,654 <10 pages>.

Non-Final Office Action of May 1, 2013 for U.S. Appl. No. 12/566,654 <10 pages>.

Final Office Action of Oct. 7, 2009 for U.S. Appl. No. 10/817,681. <19 pages>.

Restriction Requirement of Sep. 21, 2007 for U.S. Appl. No. 10/817,681. <5 pages>.

Final Office Action of Jul. 9, 2008 for U.S. Appl. No. 10/817,681. <10 pages>.

Notice of Allowance for U.S. Appl. 12/566,654 dated Nov. 6, 2013 <8 pages>.

* cited by examiner

MULTICAST FILE VIEWING AND EDITING

This application is a divisional of prior application Ser. No. 10/817,681, filed Apr. 2, 2004. application Ser. No. 10/817,681 is hereby incorporated by reference in its entirety.

BACKGROUND OF THE INVENTION

1.0 Field of the Invention

This invention relates to viewing and editing information in windows, and more particularly, to viewing and editing information in multicast windows.

2.0 Description of the Related Art

Large files in combination with a limited amount of display area on display devices continue to present problems for a user of applications and tools encompassing those files. Although many enhancements have been made over the years, significant problems still remain.

One conventional method used to display the information in a large file is to present the file in a scrollable area on the display, with various user controls, such as a scroll bar or search dialog box, and display a portion of the file containing the information or data (text and/or graphic) of interest. When the user scrolls the file, the previously displayed information may be entirely scrolled off the display screen. For example, a user may be preparing a document, such as a large research paper. The user may need to scroll or refer back to various sections of the document at different time to facilitate the task at hand, for example, editing a desired section. It would be desirable for the user to be able to retain the current document position on the display while still being able to access reference information contained in other parts of the document. Ideally the user would like to view selected sections of a file concurrently on the display, and not have them scrolled out of view with each successive search or scroll operation. In addition the user would like to edit different sections of the document as well, while all sections of interest are concurrently displayed.

One application allows a user to split a window into two panes. The document can be edited in one pane of the window, and the editing changes may appear in the other pane of the window. However, the split window does not provide independent minimize, maximize and close icons which allow each portion of the split window to be independently minimized, maximized and closed. Furthermore, the portions panels of the split window cannot be independently resized or overlapped.

In addition, that application allows a user to open new windows which display the same document as the original window. Depending on how the new window was opened, editing changes made in one window are reflected in all windows, or alternately, editing changes in one window do not appear in the other windows. However, the application does not provide a mechanism to avoid updates in one window from appearing in the other windows and subsequently allow updates to re-appear in the other windows.

Therefore there is a need for an improved technique that allows a user to concurrently view and edit different sections of information in a file in different windows. The technique should also provide a mechanism to avoid updates in one window from appearing in the other windows, and subsequently allow updates to reappear in the other windows.

SUMMARY OF THE INVENTION

To overcome the limitations in the prior art described above, and to overcome other limitations that will become apparent upon reading and understanding the present specification, various embodiments of a method, apparatus and computer readable storage medium are disclosed.

In various embodiments, a computer-implemented method displays, by an application, a portion of a unit of information in a first window on a display, and another portion of the unit of information in a second window on the display. The first window and the second window are concurrently displayed on the display. The computer-implemented method closes, by the application, the second window on the display. The closing inserts an indicator representing the second window into the unit of information and removes the second window from the display. The unit of information does not comprise the indicator prior to closing. In response to an interaction involving the indicator, the computer-implemented method redisplays, by the application, another portion of the unit of information in a third window on the display. The first window and the third window are concurrently displayed on the display. Prior to redisplaying, the indicator is displayed in the first window.

In other embodiments, a computer-readable storage medium has computer readable program code embodied therewith. The computer-readable program code is executable by a processor. The computer readable program code is executable by the processor to cause the processor to display, by an application, a portion of a unit of information in a first window on a display, and another portion of the unit of information in a second window on the display. The first window and the second window are concurrently displayed on the display. The computer-readable program code is executable by the processor to cause the processor to close, by the application, the second window on the display. The close inserts an indicator representing the second window into the unit of information and removes the second window from the display. The unit of information does not comprise the indicator prior to the close. The computer-readable program code is executable by the processor to cause the processor to, in response to an interaction involving the indicator, redisplay, by the application, another portion of the unit of information in a third window on the display. The first window and the third window are concurrently displayed on the display. Prior to the redisplay, the indicator is displayed in the first window.

In yet other embodiments, an apparatus comprises a processor and a memory. The memory stores instructions that display, by an application, a portion of a unit of information in a first window on a display, and another portion of the unit of information in a second window on the display. The first window and the second window are concurrently displayed on the display. The memory stores instructions that close, by the application, the second window on the display. The close inserts an indicator representing the second window into the unit of information and removes the second window from the display. The unit of information does not comprise the indicator prior to the close. The memory stores instructions that, in response to an interaction involving the indicator, redisplay, by the application, another portion of the unit of information in a third window on the display. The first window and the third window are concurrently displayed on the display. Prior to the redisplay, the indicator is displayed in the first window.

BRIEF DESCRIPTION OF THE DRAWINGS

To facilitate understanding, identical reference numerals have been used, where possible, to designate identical elements that are common to some of the figures.

DESCRIPTION

After considering the following description, those skilled in the art will clearly realize that the teachings of the various embodiments of the present invention can be utilized to view and/or edit multicast windows. In various embodiments, edited data is contrasted with pre-edited data. A multicast window set comprising a first window and a second window is created. The first window displays data from a unit of information. The second window is frozen in response to a user interaction with the multicast window set. At least a portion of the displayed data in the first window is edited thereby forming edited data from pre-edited data. The edited data in the first window is concurrently displayed with at least a portion of the pre-edited data in the second window.

In various embodiments, the multicast window set comprises a primary multicast window and at least one adjunct multicast window. A unit of information is typically a file.

In other embodiments, concurrent access to a plurality of subsets of a unit of information is provided. A first subset of the unit of information is displayed in a first window. An adjunct multicast window is activated in accordance with an icon associated with a removed multicast window. The icon resides within the first window. A previously displayed second portion of the unit of information is re-displayed within the adjunct multicast window.

In yet other embodiments, a multicast window set is generated. A multicast close operation is performed. Subsequently an open operation is performed, wherein displayed portions of a unit of information at the time of the multicast close operation are redisplayed in the multicast window set.

In various embodiments, information from the same file can be viewed in a plurality of multicast windows. Different multicast windows may display different subsets of information of the file. The information in one multicast window may be scrolled without changing the other multicast windows.

Figure 1:
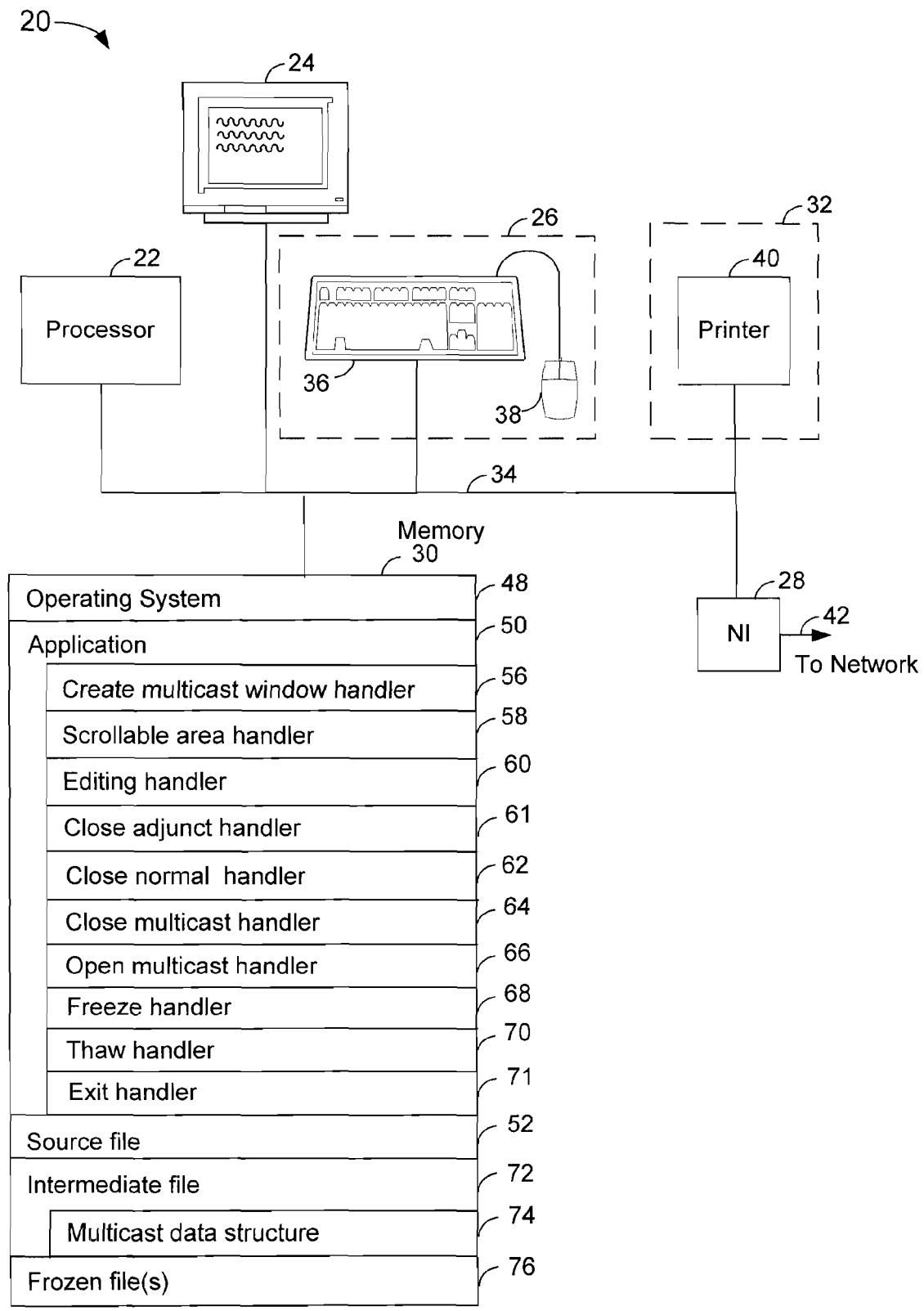
FIG. 1 depicts an illustrative computer system which uses various embodiments of the present invention.

FIG. 1 depicts an illustrative computer system which uses various embodiments of the present invention. The computer system 20 comprises a processor 22, display 24, input interfaces (I/F) 26, communications interface 28, memory 30 and output interface(s) 32, all conventionally coupled by one or more buses 34. The input interfaces 26 comprise a keyboard 36 and mouse 38. The output interface 32 comprises a printer 40. The communications interface 28 is a network interface (NI) that allows the computer 20 to communicate via a network, such as the Internet. The communications interface 28 may be coupled to a transmission medium 42 such as, a network transmission line, for example twisted pair, coaxial cable or fiber optic cable. In another exemplary embodiment, the communications interface 28 provides a wireless interface, that is, the communications interface 28 uses a wireless transmission medium.

The memory 30 generally comprises different modalities, illustratively semiconductor memory, such as random access memory (RAM), and disk drives. In some embodiments, the memory 30 stores an operating system 48, an application 50 and at least one source file 52. The application 50 typically displays the information in the file 52. In various embodiments, the application 50 comprises at least one handler to respond to events associated with a graphical user interface. In some embodiments, the handlers comprise at least one or a combination of a create multicast window handler 56, a scrollable area handler 58, an editing handler 60, a close adjunct handler 61, a close normal handler 62, a close multicast handler 64, an open multicast handler 66, a freeze handler 68, a thaw handler 70 and an exit handler 71. In various embodiments, the create multicast window handler creates an intermediate file 72. In some embodiments, the intermediate file 72 is used to accumulate editing changes. In various embodiments, the intermediate file 72 comprises a multicast data structure 74 to store information regarding the multicast windows. In other embodiments, an intermediate file 72 is not used. In some embodiments, one or more frozen files 76 are created when one or more multicast windows, respectively, are frozen. In various embodiments, the intermediate file 72 and frozen file(s) 76 are created or modified by the application 50.

The create multicast window handler 56 creates a new adjunct multicast window. The scrollable area handler 58 causes the information displayed in a scrollable area to change in response to a scrolling operation, and, in various embodiments, updates position information associated with the subset of the file displayed in a scrollable area in a multicast window. The editing handler 60 updates the multicast window being edited in addition to the intermediate file and other multicast windows that display the portion of the file being edited. The close adjunct handler 61 closes a particular individual multicast window. The close normal handler 62 closes a multicast window set. The close multicast handler 64 saves state information regarding the multicast windows in the source file 52 such that the windows of the multicast window set can be restored, and closes all of the multicast windows in the multicast window set. The open multicast handler 66 opens all the multicast windows of the multicast window set using the multicast data structure 74 in the source file that was updated by the close multicast handler 64. The freeze handler 68 freezes the information displayed in a multicast window to create a frozen multicast window, such that the information in the file associated with the frozen multicast window is not changed by subsequent edits. The thaw handler 70 thaws a frozen multicast window, and the thawed window will display the intermediate file 72 which may have been edited. The exit handler 71 is invoked when the application is to be exited.

In other embodiments, the source file 52 may be remotely located from the application 50 on another computer system and be accessed via the network. In some embodiments, the source file 52 also comprises a multicast data structure.

In various embodiments, the source file 52 comprises various types of information, including, and not limited to, text strings and objects. An object typically comprises graphical information or data. In some embodiments, an object also comprises text strings, animated objects, icons, and other objects known to those of ordinary skill in the art.

In various embodiments, the specific software instructions, data structures and data that implement various embodiments of the present inventive technique are typically incorporated in the application 50. Generally, an embodiment of the present invention is tangibly embodied in a computer-readable medium, for example, the memory 30 and is comprised of instructions which, when executed by the processor 22, cause the computer system 20 to utilize the present invention. The memory 30 may store the software instructions, data structures and data for any of the operating system 48, application 50, source file 52, intermediate file 72 and one or more frozen files 76, in semiconductor memory, in disk memory, or a combination thereof.

The operating system 48 may be implemented by any conventional operating system, such as z/OS® (Registered Trademark of International Business Machines Corporation), AIX® (Registered Trademark of International Business Machines Corporation), UNIX® (UNIX is a registered trademark of the Open Group in the United States and other countries), WINDOWS® (Registered Trademark of Microsoft Corporation) and LINUX® (Registered trademark of Linus Torvalds).

In various embodiments, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier or media. In addition, the software in which various embodiments are implemented may be accessible through the transmission medium, for example, from a server over the network. The article of manufacture in which the code is implemented also encompasses transmission media, such as the network transmission line and wireless transmission media. Thus the article of manufacture also comprises the medium in which the code is embedded. Those skilled in the art will recognize that many modifications may be made to this configuration without departing from the scope of the present invention.

The exemplary computer system illustrated in FIG. 1 is not intended to limit the present invention. Other alternative hardware environments may be used without departing from the scope of the present invention.

Figure 2:
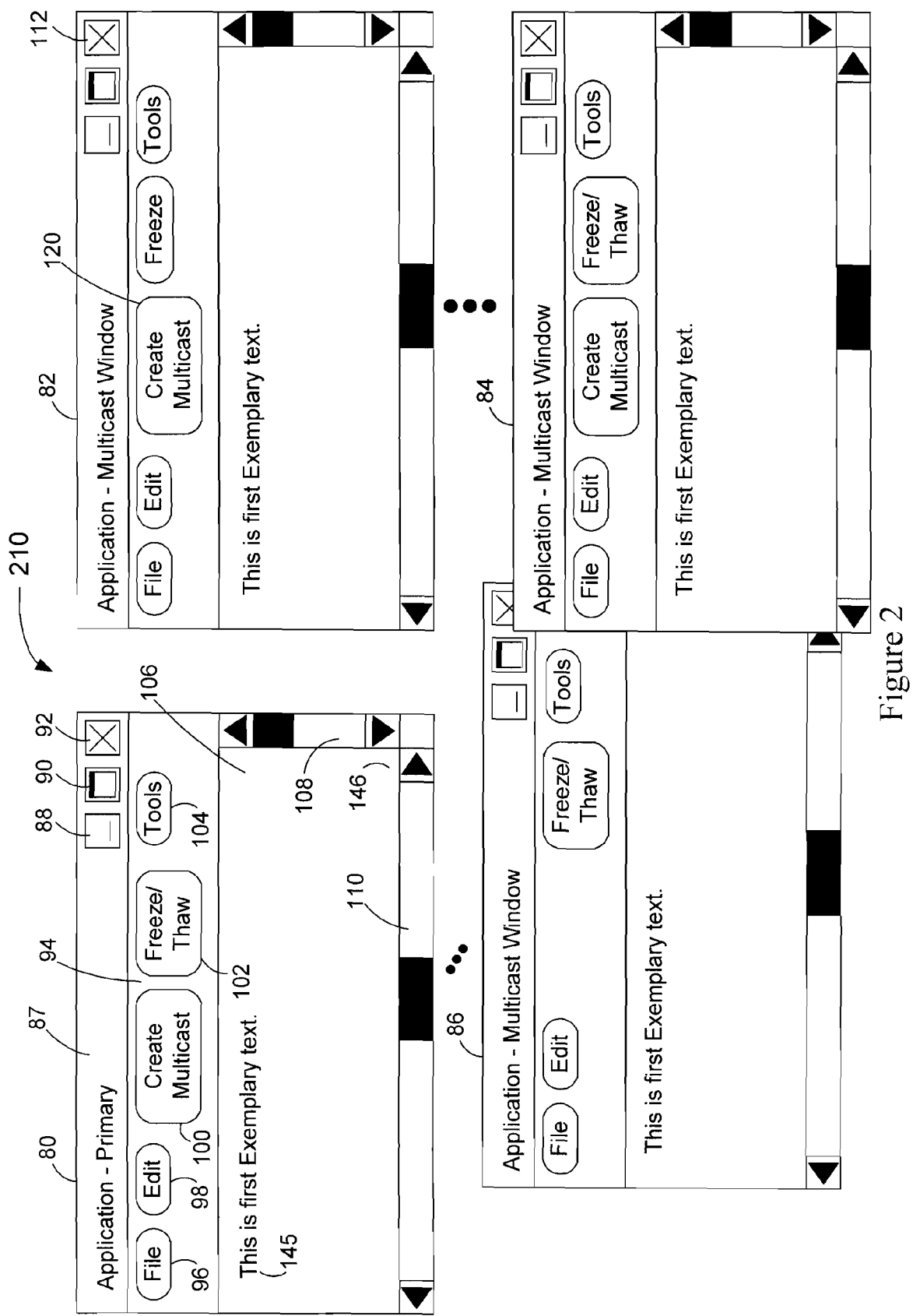
FIG. 2 depicts an embodiment of a multicast window set comprising a primary multicast window and adjunct multicast windows of an application of FIG. 1.

FIG. 2 depicts an embodiment of a multicast window set 210 comprising a primary multicast window 80 and first, second and third adjunct multicast windows, 82, 84 and 86, respectively. Initially, a user invokes the application 50 (FIG. 1) and displays the source file 52 (FIG. 1) within a window 80, referred to as the primary multicast window, created by the application 50 (FIG. 1).

In various embodiments, the primary multicast window 80 for the application 50 comprises a title bar 87 with at least one of the well-known minimize, maximize and close buttons, 88, 90 and 92, respectively. The minimize, maximize and close buttons, 88, 90 and 92, are used to reduce the size of the multicast window area, enlarge the multicast window area, and close or delete the application, respectively. Alternately, no minimize, no maximize and no close buttons are used. A toolbar 94 comprises file, edit, create multicast, freeze/thaw and tools buttons, 96, 98, 100, 102 and 104, respectively. The primary multicast window 80 further comprises a scrollable area 106 displaying at least a portion of a file, which may be the source file 52 (FIG. 1), intermediate file 72 (FIG. 1) or one of the frozen files 76 (FIG. 1), depending on the embodiment. Vertical and a horizontal scrollbars, 108 and 110, respectively, are associated with the scrollable area 106. The portion of the window that does not comprise the scrollable area and scrollbars is referred to as a control area. In various embodiments, the control area comprises the title bar 87 and toolbar 94.

In various embodiments, the application 50 (FIG. 1) is a word processing system or another application that involves viewing and/or editing of scrollable files. In some embodiments, the multicast function is activated by activating the create multicast button 100, a create multicast menu item 214 or 215 (FIG. 10), or a create multicast keystroke combination comprising one or more predetermined keystrokes (not shown), while viewing or editing a file within the application 50. Upon initially activating the multicast function in the primary multicast window 80, a new multicast window 82, that is, a first adjunct multicast window, is created. The first adjunct multicast window 82, at the time of creation, displays information from the same file as the primary multicast window 80. A multicast window other than the primary multicast window is referred to as an adjunct multicast window. In various embodiments, the first adjunct multicast window 82, and in some embodiments all adjunct multicast windows, provides the same functionality as the primary multicast window 80. In yet other embodiments, adjunct multicast windows 82, 84 and 86, do not provide all the functionality of the primary multicast window. For example, in these embodiments, the adjunct multicast windows, such as adjunct multicast window 86, do not have a create multicast button, wherein the user utilizes the create multicast button 100 within the primary multicast window to create an additional adjunct multicast window. In other embodiments, the adjunct multicast windows 82, 84 and 86, do not allow a user to edit the displayed file. In yet another embodiment, activating the close icon 112 from an adjunct multicast window 82 closes only that adjunct multicast window, while activating the close icon 92 from the primary window 80 closes the entire multicast window set 210.

In various embodiments, when creating a new adjunct multicast window, the information displayed in the new adjunct multicast window is positioned to the same starting location as the information from the file displayed in the multicast window which activated the multicast function. For example, the subset of information from the file that is displayed in the first adjunct multicast window 82 is scrolled to the same starting location as the subset of information of the file that is visible within the primary multicast window 80. The first adjunct multicast window 82, and more generally, any adjunct multicast window, following its creation, may be scrolled to any desired location within the file without affecting the display of any other primary or adjunct multicast windows. The displayed file in the primary multicast window 80 may also be scrolled without affecting the display of the adjunct multicast window 82. In some alternate embodiments, when creating a new adjunct multicast window, the new adjunct multicast window displays the information at the start of the source file.

In various embodiments, the first adjunct multicast window 82 also has a create multicast button 120. When the create multicast button 120 of the first adjunct multicast window 82 is activated, a second adjunct multicast window 84 is created. Alternately, when the create multicast button 100 in the primary multicast window 80 is activated, the second adjunct multicast window 84 is created. When creating the second adjunct multicast window 84, the displayed file in the second adjunct multicast window 84 is scrolled to the same starting location of the file that is visible within the multicast window from which the create multicast function was activated. The second adjunct multicast window 84, following its creation, may be scrolled to any desired location within the file without affecting the display of the primary multicast window 80 or the first adjunct multicast window 82.

In some embodiments, the primary multicast window and the adjunct multicast windows are visible on the display, although, at the preference of the user, the windows of the multicast window set may be overlapped in varying degrees in accordance with the desire of the user and the size of the computer display. For example, multicast window 84 overlaps multicast window 86. Window operations are performed on a window. A window operation comprises relocating, minimizing, maximizing and resizing a window. In various embodiments, the adjunct multicast windows may be relocated, minimized, maximized and resized, in addition to providing the functionality of the application. In some embodiments, each multicast window may be relocated, minimized, maximized and resized independently of the other multicast windows, that is, the other multicast windows are unchanged.

The multicast function may be invoked multiple times, facilitating the deployment of a plurality of multicast windows. The number of multicast windows may be limited by the physical constraints imposed by the size of the computer display, wherein at some point additional multicast windows would not be practical due to excessive congestion within the displayable space.

In various embodiments, the application 50 may open multiple, different source files in the primary multicast window 80. Each source file opened within the application may be associated with its own multicast window set. For simplicity, various embodiments of the present invention will be described with respect to a single source file and a single multicast window set. In various embodiments, the intermediate file 72 (FIG. 1) is associated with each multicast window 80, 82, 84 and 86, of the multicast window set 210. In some embodiments, each multicast window 80, 82, 84 and 86, of the multicast window set 210 displays a subset of the information of the intermediate file 72 (FIG. 1).

In other embodiments, multiple intermediate files are associated with the multicast windows of the multicast window set. In some embodiments, different multicast windows are associated with different intermediate files.

Figure 3:
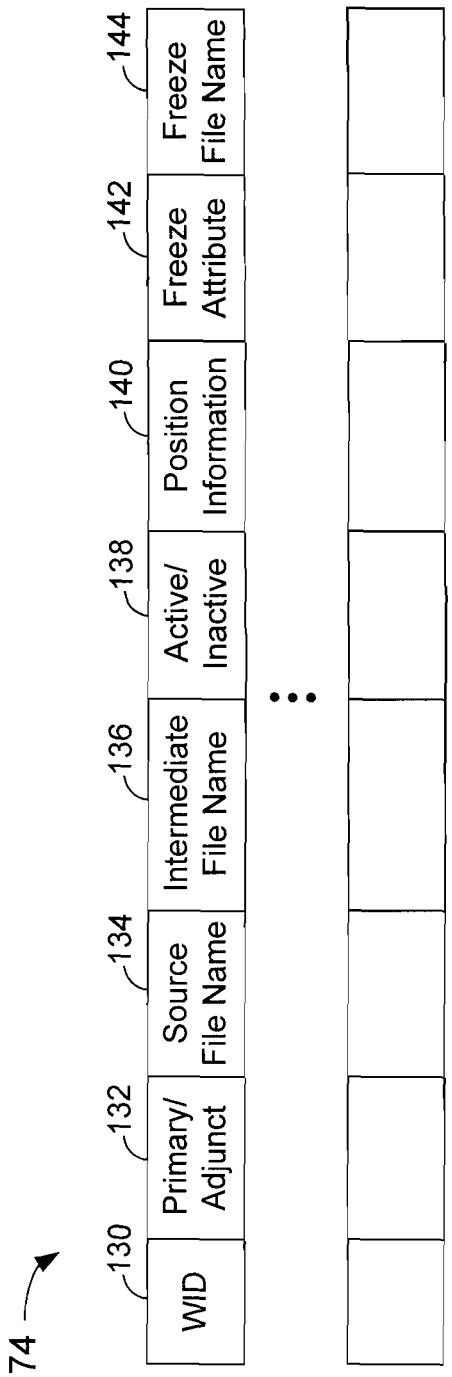
FIG. 3 depicts a block diagram of an embodiment of a multicast data structure of FIG. 1.

FIG. 3 depicts a block diagram of an embodiment of the multicast data structure 74 of FIG. 1. Typically the multicast data structure 74 is stored as part of the intermediate file 72 (FIG. 1). In other embodiments, the multicast data structure 74 is stored separate from the intermediate file 72 (FIG. 1). In some embodiments, the application 50 is associated with multiple source files, and each source file is associated with a multicast data structure 74. The multicast data structure 74 is typically an array. In various embodiments, the multicast data structure 74 comprises, for each multicast window, a window identifier (WID) field 130, a primary/adjunct indicator field (Primary/Adjunct) 132, a source file name field (Source File Name) 134, an intermediate file name field (Intermediate File Name) 136, an active/inactive field (Active/Inactive) 138 and a position information field (Position Information) 140. In some embodiments, the multicast data structure 74 further comprises a freeze attribute field (Freeze Attribute) 142 and a freeze file name field (Freeze File Name) 144.

In various embodiments, the position information 140 comprises a starting position associated with the first character or object displayed in the scrollable area, referred to as a start-visible position. In other embodiments, the position information further comprises an ending position associated with the last character or object displayed in the scrollable area, referred to as an end-visible position. In some embodiments, the start-visible and end-visible position information are relative byte offsets from the start of the file. In other embodiments, the start-visible position is a relative byte offset from the start of the file, and the end-visible position information is a relative byte offset from the start-visible position.

Typically, the multicast data structure 74 does not exist until an adjunct multicast window is created. In an alternate embodiment, a row in the multicast data structure 74 is provided for the primary multicast window when the source file 52 (FIG. 1) is opened. In the row, a window identifier associated with the primary multicast window is stored in the window identifier field 130, the primary/adjunct indicator field 132 is set to primary, the source file name field 132 stores the name of the source file, or alternately, a handle thereto, the active/inactive field 138 is set to active, position information is stored in the position information field 140, the freeze attribute field 142 is set to a value representing a thaw state, and the remaining fields store NULLs. In some embodiments, if an intermediate file exists for the source file, the name of the intermediate file, or a handle thereto, is stored in the intermediate file name field 136.

Figure 4:
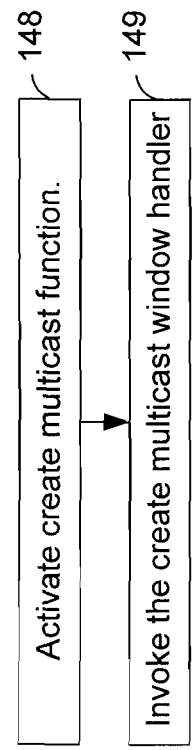
FIG. 4 depicts a flowchart of an embodiment of activating the multicast function to create an adjunct multicast window of FIG. 2.

FIG. 4 depicts a flowchart of an embodiment of activating a multicast window of FIG. 2. In various embodiments, when the create multicast function is activated, a new adjunct multicast window is created. In a multicast window, as described above, a currently visible section of a document is associated with a start-visible position 145 (FIG. 2) and an end-visible position 146 (FIG. 2). The information between the start-visible position 145 (FIG. 2) and end-visible position 146 (FIG. 2) is the currently visible section. In various embodiments, information from the source file is automatically displayed in the new adjunct multicast window beginning with the information in the source file at the start-visible position of the multicast window from which the create multicast function was activated.

In step 148, the create multicast function, or multicast function, is activated, by for example, activating the create multicast button 100 or 120 of FIG. 2, from a menu item, or through one or more keyboard keystrokes. In step 149, in response to activating the multicast function, in various embodiments, the create multicast window handler 56 (FIG. 1) is invoked.

Figure 5:
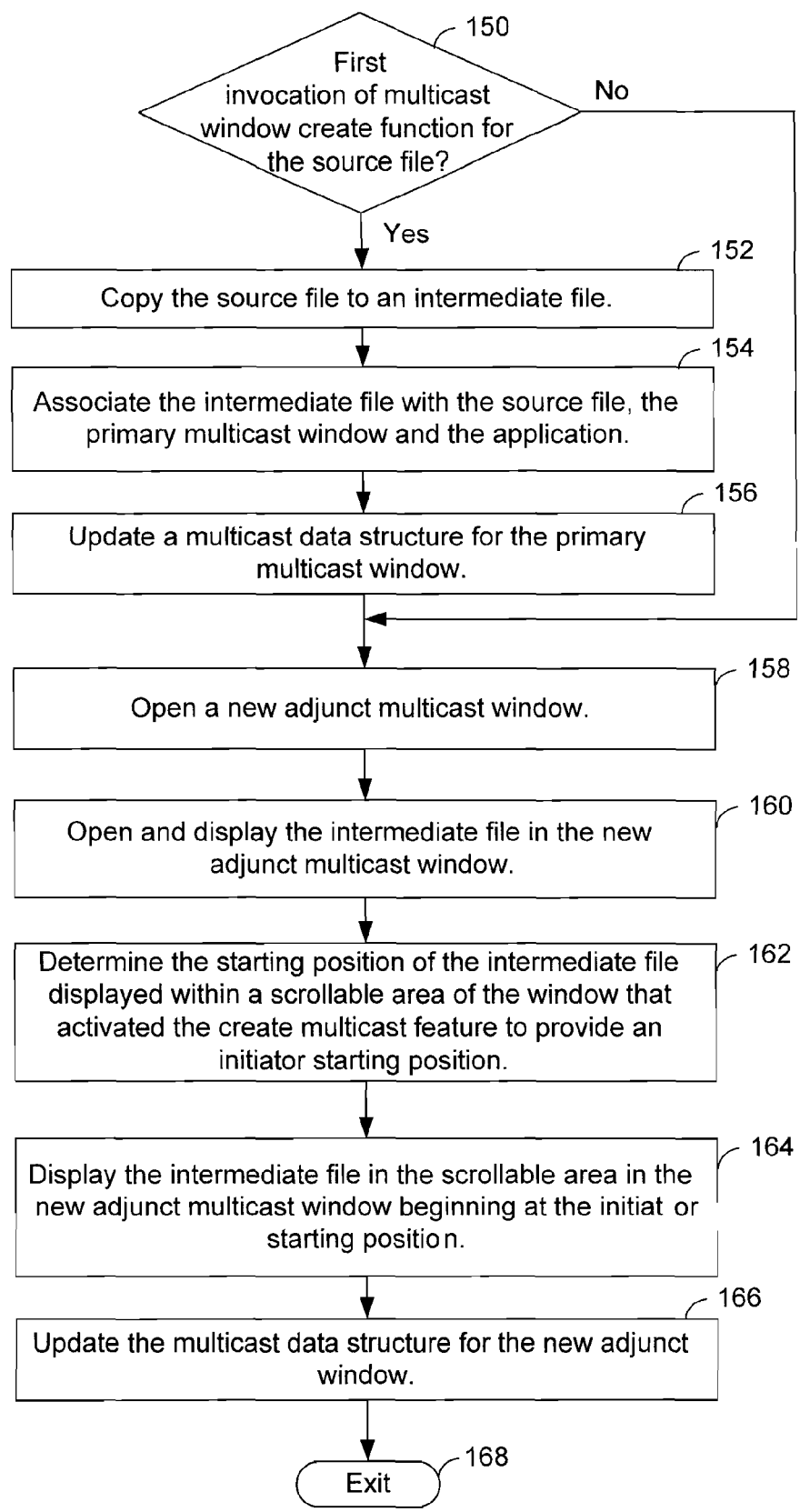
FIG. 5 depicts a flowchart of an embodiment of creating a new adjunct multicast window of FIG. 2.

FIG. 5 depicts a flowchart of an embodiment creating an adjunct multicast window. In various embodiments, the flowchart of FIG. 5 is implemented in the create multicast window handler 56 of FIG. 1. In some embodiments, when the source file is opened in the application, the application creates a copy of the source file, referred to as an intermediate file that is displayed and is used to accumulate editing changes. Alternately, the application does not create an intermediate file and uses the source file directly.

Step 150 determines if this is the first invocation of the multicast window create function for the source file in the current application session. In some embodiments, the create multicast window handler searches for a multicast data structure 74 (FIG. 3), and when no multicast data structure exists for the source file, this is the first invocation of the multicast window create function for the source file in the current application session. For example, the multicast data structure 74 (FIG. 3) may be stored at a predetermined location in the intermediate file 72 (FIG. 1), such as at the beginning or end of the intermediate file. Alternately, the multicast data structure 74 (FIG. 1) is stored separately from the intermediate file 72 (FIG. 1). When the multicast data structure 74 (FIG. 3) exists, then the multicast create function was previously invoked for the source file. Alternately, the multicast data structure may be created when a source file is first opened. In this embodiment, the multicast data structure 74 is examined to determine if this is the first multicast create function for this source file. In some embodiments, when the multicast data structure comprises more than one row, the multicast create function was previously invoked for the source file. When the multicast data structure comprises a single row, associated with the primary multicast window, the multicast create function was not previously invoked for the source file.

When step 150 determines that this is the first invocation of the multicast window create function for the source file in the current application session, no adjunct multicast windows are created or displayed. In some embodiments, in step 152, the source file 52 (FIG. 1) is copied to the intermediate file 72 (FIG. 1). The create multicast window handler 56 (FIG. 1) determines a name for the intermediate file 72 (FIG. 1). For example, the intermediate file 72 (FIG. 1) may have the same name as the primary file, but with a different extension. Alternately, a prefix may be added to the name of the source file to provide the intermediate file name. In another alternate embodiment, the create multicast window handler creates a distinct name for the intermediate file 72 (FIG. 1).

In step 154, the intermediate file 72 (FIG. 1) is associated with the source file, the primary multicast window, and the application. In some embodiments, when the intermediate file has been created prior to invoking the create multicast function, steps 152 and 154 are omitted. In step 156, the multicast data structure 74 (FIG. 3) is updated. Each multicast window is associated with a row of the multicast data structure 74 (FIG. 3). A window, or alternately, the instance of the application and source file associated with the window, is typically associated with a window identifier. Each window is associated with a distinct window identifier. In some embodiments, the window identifier may be a process identifier. A row is added to the multicast data structure 74 (FIG. 3) for the primary multicast window. The window identifier of the primary multicast window is stored in the window identifier (WID) field 130 (FIG. 3) of the multicast data structure 74 (FIG. 3). A primary/adjunct indicator field 132 (FIG. 3) in the multicast data structure 74 (FIG. 3) is set to primary. The name of the source file, or alternately, a handle to the source file, is stored in the source file name field 134 (FIG. 3). The name of the intermediate file, or alternately, a handle to the intermediate file, is stored in the intermediate file name field 136 (FIG. 3). The active/inactive field 138 (FIG. 3) is set to active. The position information 140 (FIG. 3) is set to the start-visible position of the source file that was displayed in the primary multicast window. In other embodiments, the position information 140 (FIG. 3) also comprises an end-visible position which is set to the end-visible position of the source file that was displayed in the primary multicast window. In some embodiments, a freeze attribute field 142 (FIG. 3) is set to "thaw" and the freeze file name field 144 (FIG. 3) is NULL. In other embodiments, the freeze attribute field 142 (FIG. 3) and the freeze file name field 144 (FIG. 3) are omitted. In an alternate embodiment, step 156 is omitted when the row of the multicast data structure 74 (FIG. 3) associated with the primary multicast window has been created prior to invoking the create multicast window handler 56 (FIG. 1). Step 156 proceeds to step 158. In an alternate embodiment, when the multicast data structure 74 (FIG. 3) contains the information for the primary multicast window prior to activating the create multicast function, step 156 is omitted. In another alternate embodiment, when the intermediate file exists and the multicast data structure contains the information for the primary multicast window prior to activating the create multicast function, steps 150 to 156 are omitted.

When step 150 determines that this is not the first invocation of the multicast window create function for the source file in the current application session, that is, the create multicast function was previously invoked for this source file in the current application session, step 150 proceeds to step 158.

In step 158, a new adjunct multicast window is opened. In some embodiments, another instance of the application is opened in a new adjunct multicast window. In step 160, the intermediate file is opened within the new adjunct multicast window and displayed.

In step 162, the starting position of the intermediate file displayed within the scrollable area of the multicast window that activated the create multicast function is determined to provide an initiator starting position. In some embodiments, the initiator starting position is the start-visible position for that multicast window which is stored in the multicast data structure. Alternately, in step 162, the initiator starting position is set to the start of the intermediate file. In step 164, the intermediate file is displayed in the scrollable area of the new adjunct multicast window beginning at the initiator starting position. In an alternate embodiment, step 162 is omitted, and step 164 displays the intermediate file in the scrollable area of the new adjunct multicast window beginning at the start of the intermediate file. The amount of information displayed depends on the size of the new adjunct multicast window. In some embodiments, the new adjunct multicast window has a predetermined size. In other embodiments, the position information of the multicast data structure comprises an end-visible position. In various embodiments, the end-visible position is used to adjust the size of the new adjunct multicast window to display the information between the start-visible position and the end-visible position.

In step 166, the multicast data structure 74 (FIG. 3) is updated for the new adjunct multicast window. Another row is added to the multicast data structure 74 (FIG. 3) with information for the new adjunct multicast window. The window identifier of the new adjunct multicast window is stored in the WID field 130 (FIG. 3) of the multicast data structure 74 (FIG. 3). A primary/adjunct indicator field 132 (FIG. 3) in the multicast data structure 74 (FIG. 3) is set to adjunct. The name of the source file, or alternately, a handle to the source file, is stored in the source file name field 134 (FIG. 3). In some embodiments, for adjunct multicast windows, the source file name field 134 (FIG. 3) is set to NULL. The name of the intermediate file, or alternately, a handle to the intermediate file, is stored in the intermediate file name field 136 (FIG. 3). The active/inactive field 138 (FIG. 3) is set to active. The position information 140 (FIG. 3) is set equal to the position information associated with the multicast window from which the create multicast function was invoked. In some embodiments, the freeze attribute field 142 (FIG. 3) is set to "thaw" and the freeze file name 144 (FIG. 3) field is NULL to indicate that there is no frozen file for the multicast window. Alternately, the freeze attribute field 142 (FIG. 3) is set to "frozen," the intermediate file is copied to provide a freeze file, and the name of the freeze file is stored in the freeze file name field 144 (FIG. 3). In step 168, the create multicast window handler 56 (FIG. 1) exits.

Any file displayed in any multicast window may be scrolled to any desired location within the file without affecting the display of any other multicast windows. In various embodiments, as a file displayed in a multicast window is scrolled, the position information associated with that multicast window is stored in the multicast data structure 74 (FIG. 3).

Figure 6:
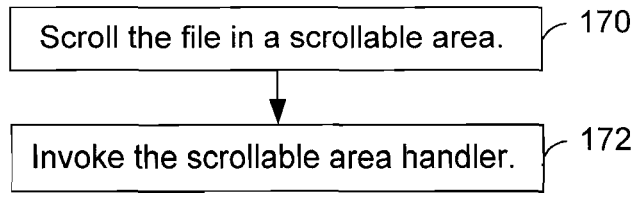
FIG. 6 depicts a flowchart of scrolling the file displayed in a multicast window and invoking a scrollable area handler of FIG. 1.

FIG. 6 depicts a flowchart of scrolling the file displayed in a multicast window and invoking a scrollable area handler 58 of FIG. 1. In step 170, the file is scrolled by a user. The file may be scrolled using any well-known technique. In some embodiments, a user positions the slider on a scroll bar to display desired information in the file. The file may also be scrolled by clicking on the scrollbar itself between the slider and an opposing arrow, clicking on the opposing arrows, and using a scrolling mouse. In various embodiments, the file is repositioned or scrolled from a "goto" specified page number menu choice. In another alternate embodiment, the file is repositioned or scrolled when a search or "find" is performed. In some embodiments, a user, via a mouse, grabs (right clicks) on a location in the scrollable area and repositions the file using the mouse. In other embodiments, the file may be repositioned using hyperlinks. In another embodiment, the file in the scrollable area is scrolled by pressing a scroll "button" on a mouse. Alternately, a trackball may be used for scrolling. In yet other embodiments, the file in the scrollable area is scrolled using a key on a keyboard, for example, one of the up, down, left and right arrow keys, or one of the page up or down keys. These and numerous other methods of scrolling are familiar to those of ordinary skill in the art. In step 172, in response to the scrolling, the scrollable area handler 58 (FIG. 1) is invoked.

Figure 7:
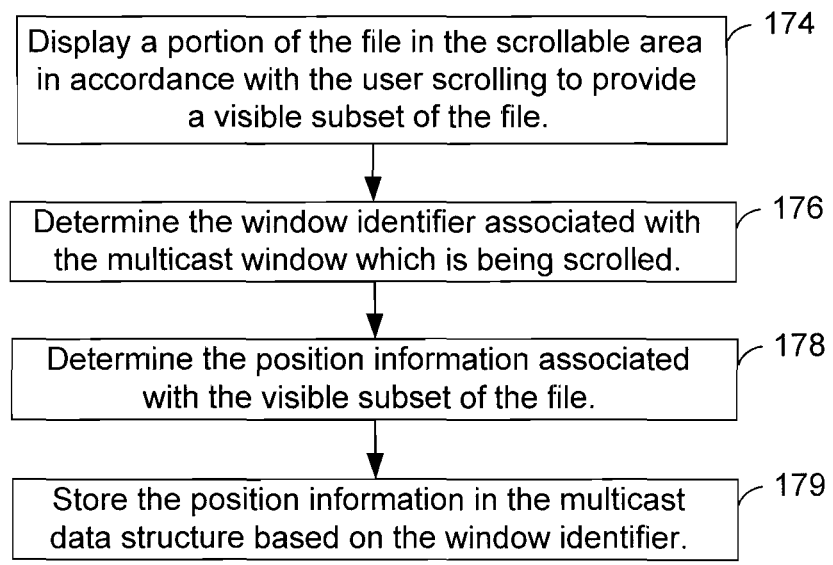
FIG. 7 depicts a flowchart of an embodiment of the scrollable area handler of FIG. 1.

FIG. 7 depicts a flowchart of an embodiment of the scrollable area handler 58 of FIG. 1. In step 174, a subset of the file is displayed in the scrollable area in accordance with the user scrolling to provide a visible subset of the file. In step 176, the window identifier associated with the multicast window which is being scrolled is determined. In step 178, the position information associated with the visible subset of the file is determined. In some embodiments, the start-visible position is determined. In other embodiments, the end-visible position is also determined. In step 179, the position information is stored in the multicast data structure 74 (FIG. 3) based on the window identifier. In some embodiments, the start-visible position is stored in the position information 140 (FIG. 3) of the multicast data structure 74 (FIG. 3). In other embodiments, the end-visible position is also stored in the position information 140 (FIG. 3) in the multicast data structure 74 (FIG. 3).

In various embodiments, any editing changes initiating from any multicast window are available to any other multicast window within the multicast window set whenever the edited content is displayed or scrolled into the scrollable area of a multicast window. In these embodiments, each window within the multicast window set may be scrolled and edited without disrupting the displayed information in the other multicast windows in the multicast window set when the editing is performed in a subset of the file that is not viewable in the other multicast windows. However, a change made from one multicast window is potentially viewable, and in some embodiments, is always viewable, in the scrollable area of any other multicast window within the multicast set when the subset of the file containing the change is scrolled into the scrollable area of the other multicast window. In some embodiments, the change seems to appear simultaneously in other multicast windows which have overlapping content, such that the changed text or object is displayed within those multicast windows. Otherwise, the changes appear when scrolled into the scrollable area in a multicast window.

In various embodiments, the multicast window set reflects the editing performed by the user. In some embodiments, the intermediate file 72 (FIG. 1) is created with the creation of the first adjunct multicast window (FIG. 5, step 152). In some embodiments, all editing changes are accumulated within the intermediate file 72 (FIG. 1), and the data displayed on any window within the multicast window set reflects the data residing within the intermediate file. Initially, the intermediate file 72 (FIG. 1) is a mirror image of the source file 52 (FIG. 1) displayed within the primary multicast window. From that point forward, editing changes are accumulated within the intermediate file 72 (FIG. 1). A subsequent "save" operation, performed either explicitly or as part of a close operation, results in the intermediate file 72 (FIG. 1) being copied back to the original source file 52 (FIG. 1).

Figure 8:
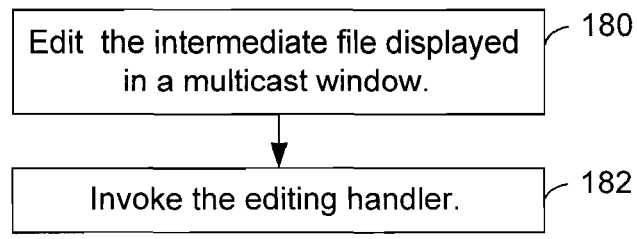
FIG. 8 depicts a flowchart of editing the file displayed in a multicast window and invoking an editing handler of FIG. 1.

FIG. 8 depicts a flowchart of editing the intermediate file that is displayed in the multicast window and invoking the editing handler 60 of FIG. 1. In step 180, the intermediate file 72 (FIG. 1) is edited in a multicast window. For example, a character may be inserted in the text, or text may be deleted. In step 182, in response to the editing, the editing handler 60 of FIG. 1 is invoked. In some embodiments, the editing handler 60 (FIG. 1) is invoked when a character added or deleted. In other embodiments, the editing handler 60 (FIG. 1) is invoked when a predetermined number of contiguous characters are added or deleted.

Figure 9:
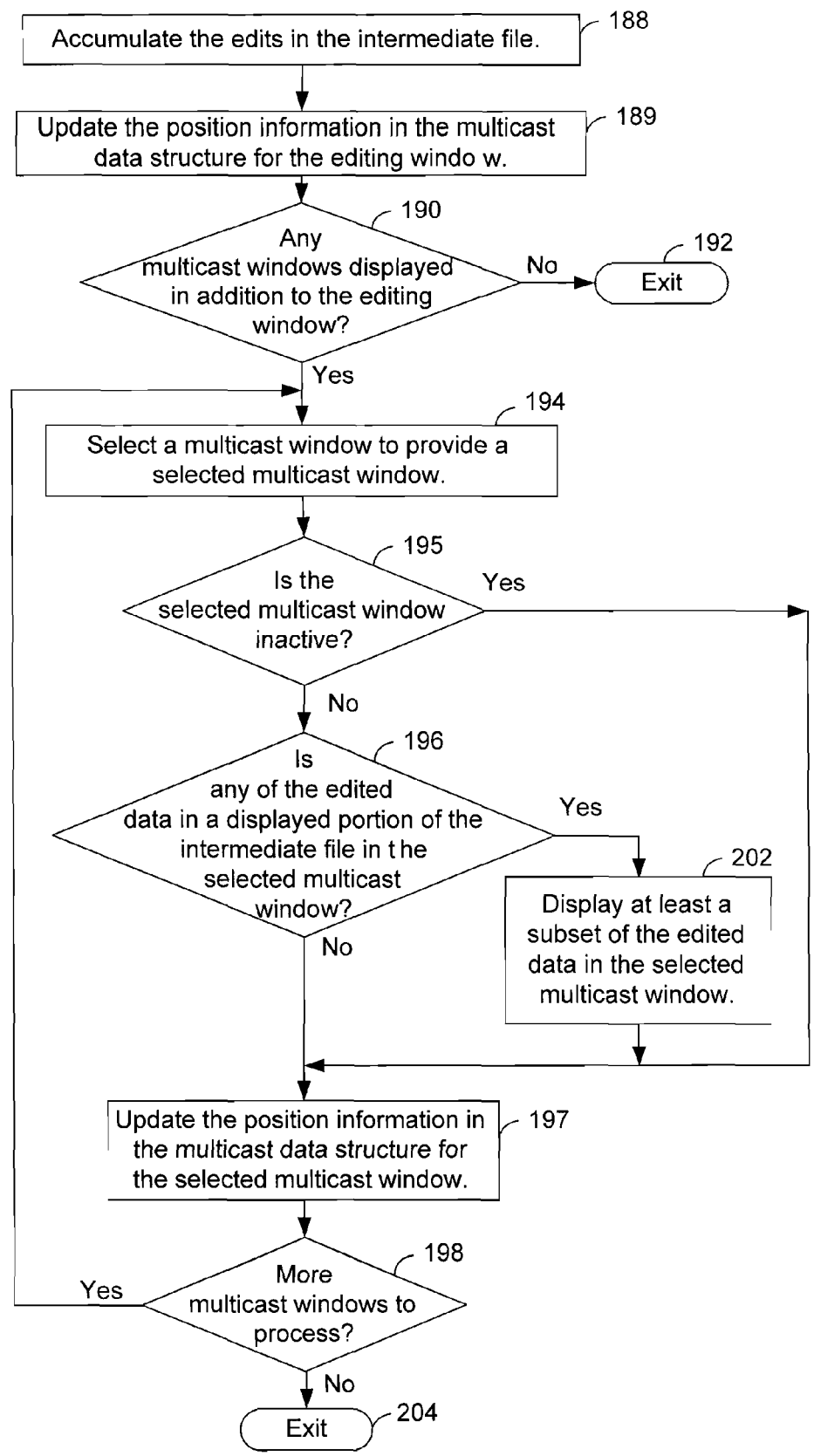
FIG. 9 depicts a flowchart of an embodiment of updating multicast windows when one of the multicast windows is being edited.

FIG. 9 depicts a flowchart of an embodiment of updating other multicast windows when another one of the multicast windows, referred to as the editing window, is being edited. In various embodiments, the flowchart of FIG. 9 is implemented in the editing handler 60 of FIG. 1. In other embodiments, the flowchart of FIG. 9 can be implemented in an existing handler of the application.

In step 188, the edits are accumulated in the intermediate file. In step 189, the position information 140 (FIG. 3) in the multicast data structure 74 (FIG. 3) for the editing window is updated. In some embodiments, the start-visible position for the editing window is determined and stored in the position information 140 (FIG. 3) of the multicast data structure 74

(FIG. 3) based on the window identifier 130 (FIG. 3) of the editing multicast window. In other embodiments, the end-visible position for the editing window is also determined and stored in the position information 140 (FIG. 3) of the multicast data structure 74 (FIG. 3) based on the window identifier 130 (FIG. 3) of the editing multicast window.

Step 190 determines whether any multicast windows are displayed in addition to the editing window. In some embodiments, the multicast data structure 74 (FIG. 3) is examined, to determine whether any other multicast windows are displayed. When at least two rows, each associated with a multicast window, have the active/inactive field 138 (FIG. 3) set to active, at least one other multicast window is displayed. When only one row has the active/inactive field 138 (FIG. 3) set to active, no other multicast windows are displayed. When no other multicast windows are displayed, in step 192, the editing handler exits.

When step 190 determines that at least one additional multicast window is displayed, in step 194, the editing handler 60 (FIG. 1) selects a multicast window, other than the editing window, to provide a selected multicast window. In some embodiments, the editing handler 60 (FIG. 1) determines the window identifier 130 (FIG. 3) of the editing window to provide an editing-window identifier, and, based on the multicast data structure 74 (FIG. 3), selects a multicast window associated with a window identifier that is different from the editing-window identifier.

Step 195 determines whether the selected multicast window is inactive. In various embodiments, the active/inactive field 138 (FIG. 3) associated with the window identifier for the selected multicast window is examined. When the active/inactive field 138 (FIG. 3) is set to active, the selected multicast window is active; otherwise, the selected multicast window is inactive.

When step 195 determines that the selected multicast window is not inactive, step 196 determines whether any of the data being edited is in a displayed portion of the intermediate file in the selected multicast window. When step 196 determines that no data being edited is in a displayed portion of the intermediate file in the selected multicast window, in step 197, the position information in the multicast data structure 74 (FIG. 3) is updated for the selected multicast window. In various embodiments, the number of bytes added or deleted in the edited data is determined to provide an adjust value. When the edited data has added bytes, the adjust value is positive. When the edited data has deleted bytes, the adjust value is negative. For multicast windows which are inactive or for which the edited data is not visible in the selected multicast window, the position information is adjusted when the edited data is prior to the start-visible position. In some embodiments, when the edited data is prior to the start-visible position in the position information 140 (FIG. 3) in the multicast data structure for the selected multicast window, the adjust value is added to the start-visible position, and in some embodiments, the adjust value is added to the end-visible position. In various embodiments, when the edited data is between the start-visible position and end-visible position of the position information 140 (FIG. 3) in the multicast data structure 74 (FIG. 3) for the selected window, the adjust value is added to the end-visible position. The start-visible position is stored in the position information 140 (FIG. 3) of the multicast data structure 74 (FIG. 3) based on the window identifier of the selected multicast window. In some embodiments, the end-visible position is also stored in the position information 140 (FIG. 3) of the multicast data structure 74 (FIG. 3) based on the window identifier of the selected multicast window.

Step 198 determines whether there are more multicast windows to process. In various embodiments, the editing handler 60 (FIG. 1) keeps tracks of the window identifiers of the multicast windows that have been checked, and if at least one window identifier associated with a multicast window in the multicast data structure is different from those window identifiers that have been processed, then step 198 determines that there are more multicast windows to process.

When step 198 determines that there are more multicast windows to process, step 198 proceeds to step 194 to select another multicast window to process.

When step 196 determines that at least a portion of the edited data is in a displayed portion of the intermediate file in the selected multicast window, in step 202, at least a subset of the edited data is displayed in the selected multicast window. Step 202 proceeds to step 197.

When step 195 determines that the selected multicast window is inactive, step 195 proceeds to step 197. When step 198, determines that there are no more multicast windows to process, in step 204, the editing handler exits.

Figure 10:
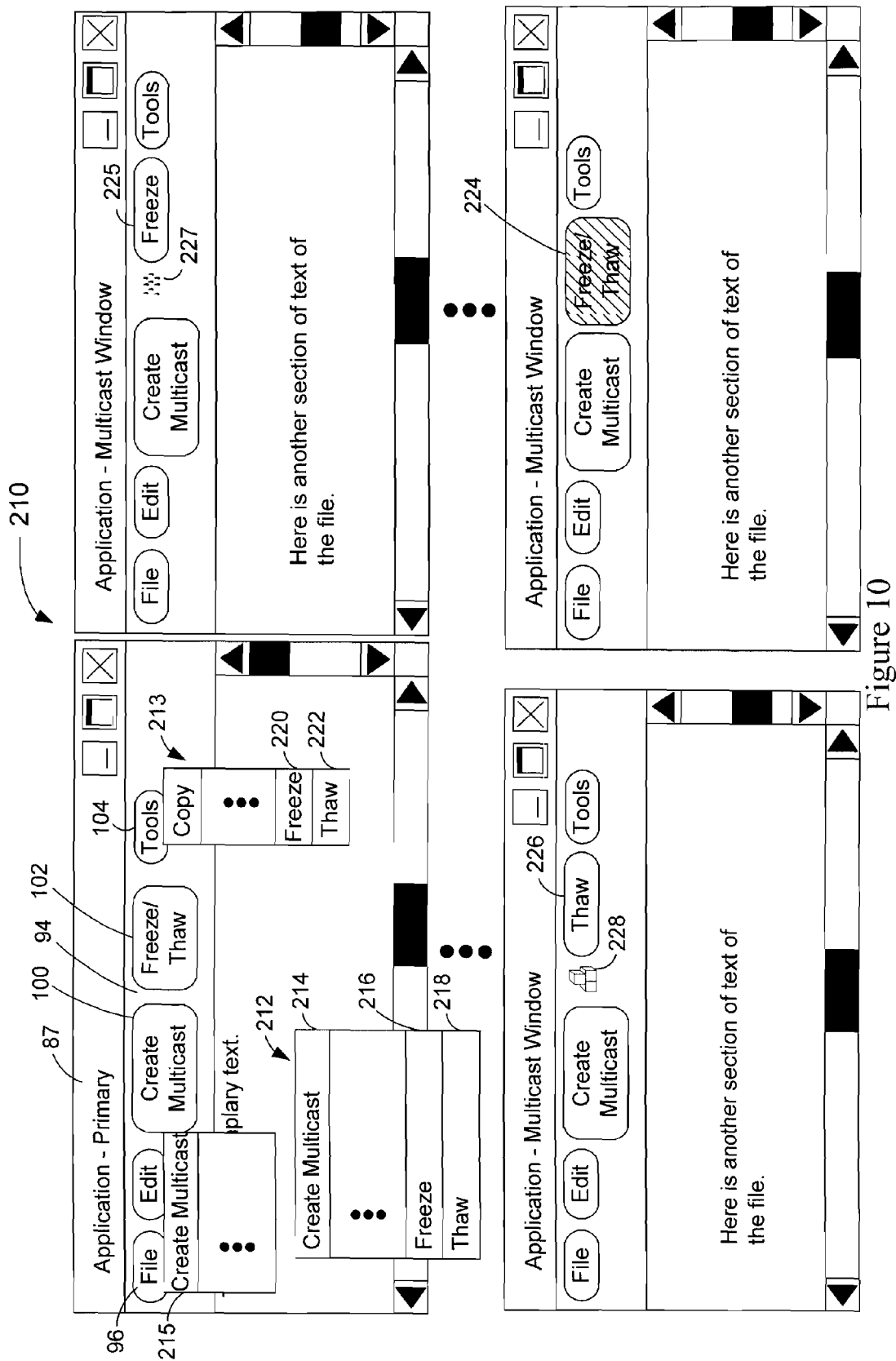
FIG. 10 depicts a diagram of an embodiment of a multicast window set, illustrating various embodiments of menus comprising at least one of a create multicast menu item, a freeze menu item and a thaw menu item.

FIG. 10 depicts a diagram of an embodiment of a plurality of multicast windows, that is, a multicast window set 210, illustrating various embodiments of menus, 212 and 213, comprising at least one of a create multicast menu item 214, 215, freeze menu items 216 and 220, and thaw menu item 218 and 222. In various embodiments, the multicast function may be implemented through a new toolbar button, or through a new menu item 215 available from the file button 96 of the tool bar 94 or through a menu 212 displayed in response to a right mouse button click. In some embodiments, the new toolbar button is the create multicast button 100. In various embodiments, when a user performs a right mouse click in the scrollable area, the displayed menu 212 comprises the create multicast menu item 214 which also implements the multicast function, and in some embodiments, when selected, invokes the create multicast window handler 56 (FIG. 1).

In other various embodiments, freeze functionality is provided. In some embodiments, when the file button 96 in the toolbar 94 is activated, menu 212 is displayed which contains the freeze and thaw menu items, 216 and 218, respectively. In other embodiments, when a tools button 104 in the toolbar 94 is activated, menu 213 is displayed which contains the freeze and thaw menu items, 220 and 222, respectively. By activating the freeze/thaw button 102 or a freeze menu item, 216 or 220, editing changes made in another multicast window are not viewable in the frozen window, thus facilitating the comparison of editing changes to the source file. In other words, a frozen window is unchanged when other multicast windows are edited. Deactivating the freeze/thaw button 102, or selecting a thaw menu item 218 or 222, reveals editing changes as they are scrolled into view within the scrollable area of the thawed multicast window. In yet another embodiment, separate freeze and thaw buttons are provided, rather than the freeze/thaw toggle button 102.

In some embodiments, the freeze/thaw button 102 acts as a toggle switch to freeze or thaw the contents of the file displayed in the multicast window. When activated in a freeze state, the freeze/thaw button is shaded 224 or changes color to distinguish it.

Alternately, the label of the freeze/thaw button is changed depending on whether the multicast window is in a thawed or frozen state. When the multicast window is in the thaw state, the label of the freeze/thaw button is "Freeze" 225. When the multicast window is in the frozen state, the label of the freeze/thaw button is "Thaw" 226.

In various embodiments, an icon representing the state of the multicast window is displayed. When the state of the multicast window is thaw, a thaw icon 227, for example, an image of rain drops, is displayed. When the state of the multicast window is freeze, a freeze icon 228, for example, an image of ice cubes, is displayed.

Figure 11:
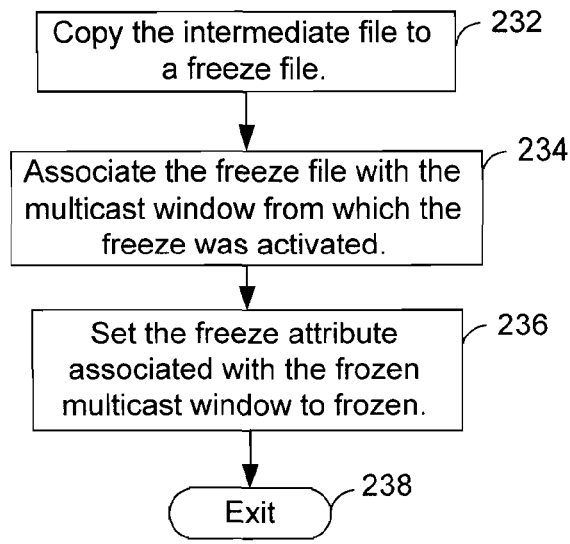
FIG. 11 depicts a flowchart of an embodiment of freezing a multicast window.

FIG. 11 depicts a flowchart of an embodiment of freezing a multicast window. In some embodiments, the flowchart of FIG. 11 is implemented in the freeze handler 68 of FIG. 1. In various embodiments, the freeze handler 68 of FIG. 1 is invoked when the freeze/thaw button 102 (FIG. 10) is activated or a freeze menu item 216 or 220 (FIG. 10) is selected.

In step 232, the intermediate file is copied to a freeze file. In step 234, the freeze file is associated with the multicast window from which the freeze was activated. In step 236, a freeze attribute field 142 (FIG. 3) associated with the frozen multicast window in the multicast data structure 74 (FIG. 3) is set to frozen. In some embodiments, the name of the freeze file is stored in the freeze file name field 144 of the multicast data structure 74 (FIG. 3). In step 238, the freeze handler 68 (FIG. 1) exits.

Figure 12A:
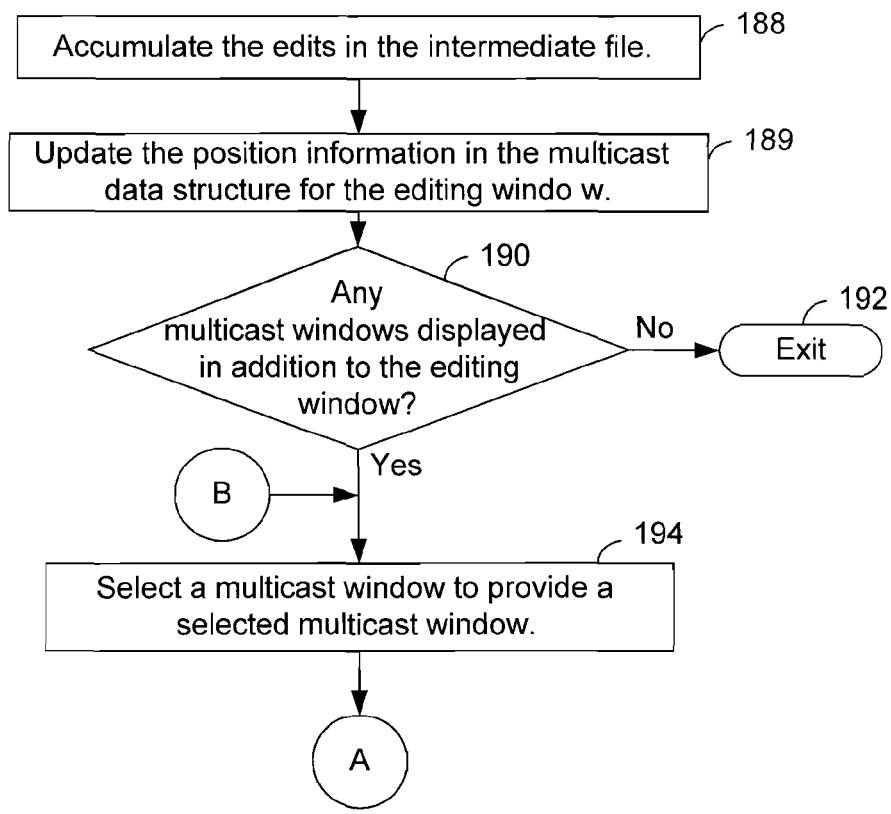
FIGS. 12A and 12B collectively depict a flowchart of an embodiment of updating edited information in multicast windows when a multicast window is frozen.
Figure 12B:
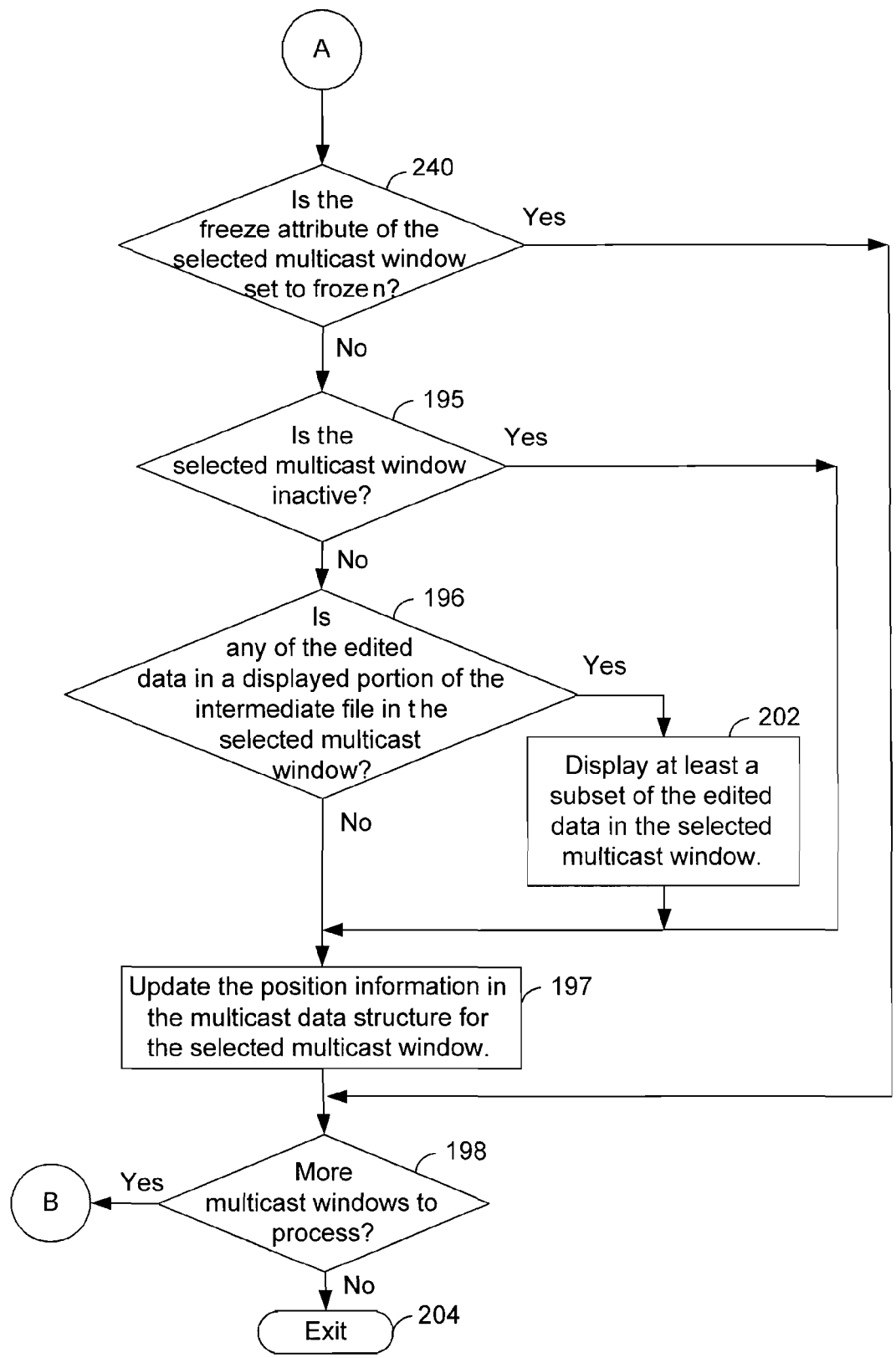

FIGS. 12A and 12B collectively depict a flowchart of an embodiment of updating edited information in a multicast window set when a multicast window is frozen. In some embodiments, the flowchart of FIGS. 12A and 12B is implemented in the editing handler 60 (FIG. 1). The flowchart of FIGS. 12A and 12B is similar to the flowchart of FIG. 9; therefore the differences will be described. FIG. 12A comprises steps 188 to 194 of FIG. 9; steps 188 to 194 are described above with reference to FIG. 9. Step 194 of FIG. 12A proceeds via continuator A to step 240 of FIG. 12B. In FIG. 12B, step 240 determines whether the freeze attribute 142 (FIG. 3) associated with the selected multicast window is set to frozen. When the freeze attribute 142 (FIG. 3) is set to frozen, step 240 proceeds to step 198. When the freeze attribute 142 (FIG. 3) is not set to frozen, step 240 proceeds to step 195. FIG. 12B further comprises steps 195 to 204 of FIG. 9; steps 195 to 204 are described above with reference to FIG. 9.

Figure 13:
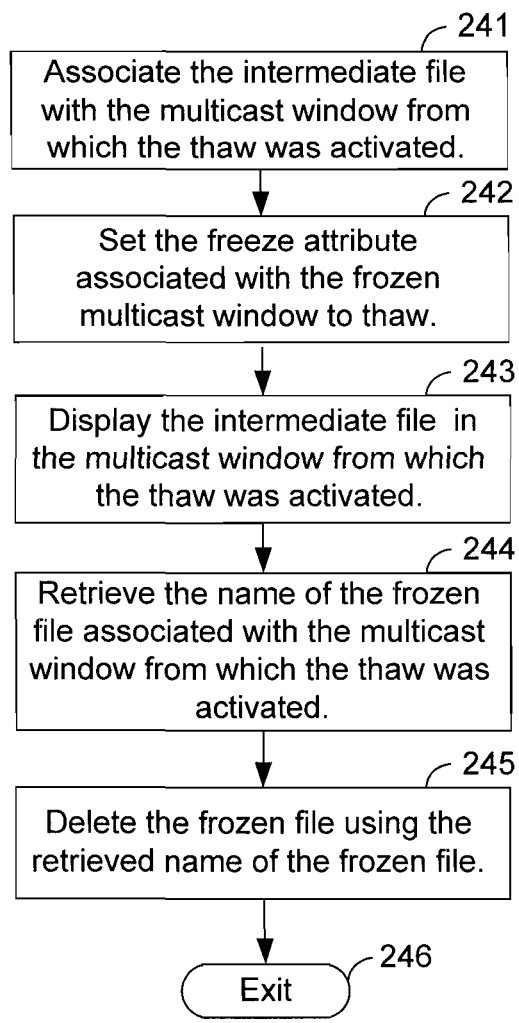
FIG. 13 depicts a flowchart of an embodiment of thawing a frozen multicast window.

FIG. 13 depicts a flowchart of an embodiment of thawing a frozen multicast window of FIG. 10. In various embodiments, the flowchart of FIG. 13 is implemented in the thaw handler 70 of FIG. 1. In some embodiments, the thaw handler 70 (FIG. 1) is invoked when the thaw menu item 218 or 222 (FIG. 10) is selected, or when the freeze/thaw button 102 (FIG. 10) is toggled to thaw.

In step 241, the intermediate file is associated with the multicast window from which the thaw was activated, referred to as a thawed window. In some embodiments, the name or handle of the intermediate file is retrieved from the row in multicast data structure 74 (FIG. 3) for the thawed window. In step 242, the freeze attribute 142 (FIG. 3) associated with the frozen multicast window is set to thaw. In step 243, the intermediate file is displayed in the multicast window from which the thaw was activated, the thawed window. In step 244, the name of the frozen file associated with the multicast window from which the thaw was activated is retrieved from the freeze file name field 144 (FIG. 3) of the multicast data structure 74 (FIG. 3). In step 245, the frozen file is deleted using the retrieved name of the frozen file. In step 246, the thaw handler 70 (FIG. 1) exits.

Figure 14:
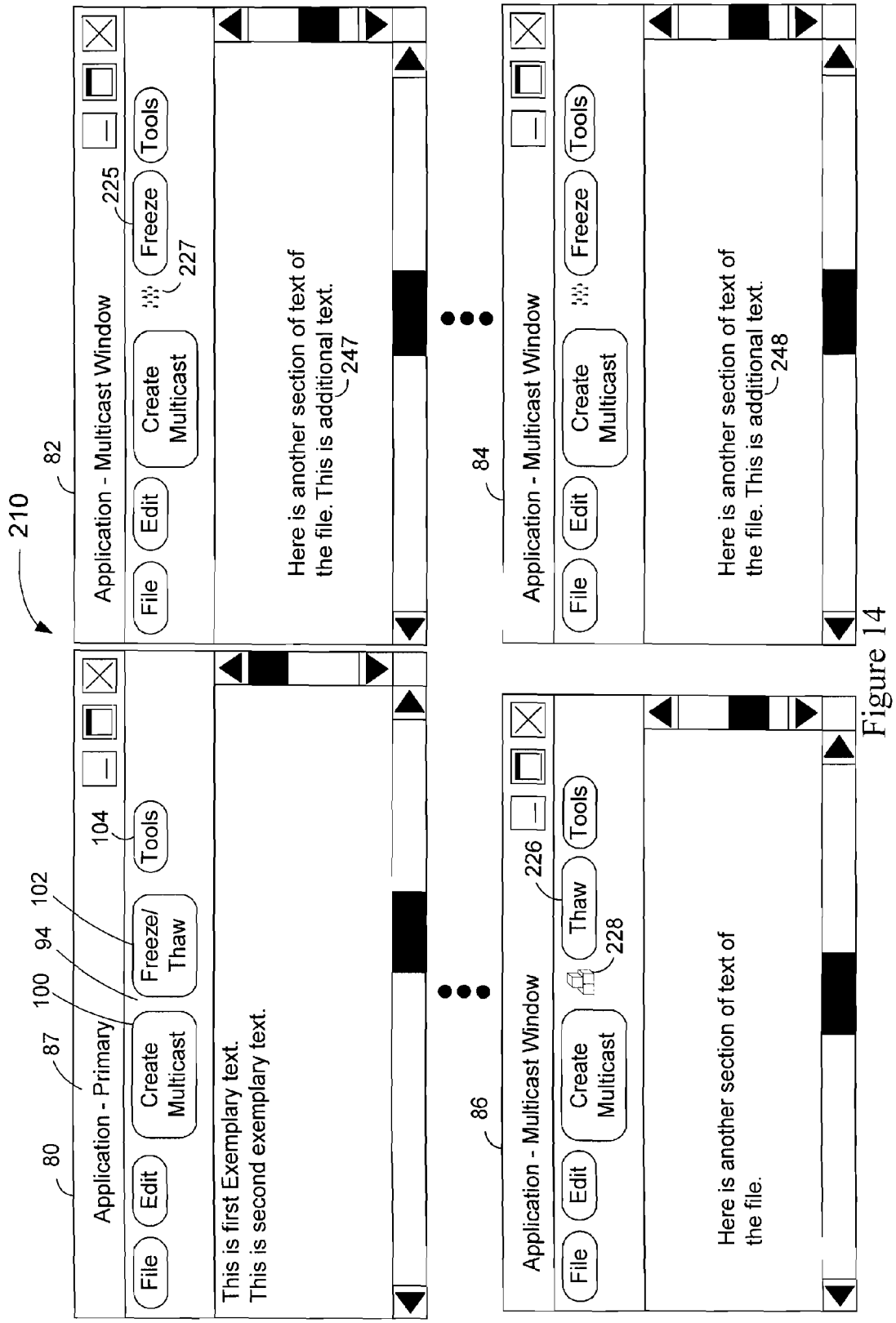
FIG. 14 depicts a diagram of an embodiment illustrating the editing operation in a multicast window set having a frozen window.

FIG. 14 depicts a diagram of an embodiment illustrating the editing operation in a multicast window set 210 having a frozen window 86. The user is editing adjunct multicast window 82 and has inserted text 247. Because adjunct multicast window 84 is in a thaw state, the same text 248 appears in multicast window 84. Because multicast window 86 is in a frozen state, as indicated by icon 228, the text is not added to adjunct multicast window 86 and adjunct multicast window 86 remains unchanged. Because the primary multicast window 80 is displaying a different portion of the file, the new text 247 does not appear in the primary multicast window 80, but is available if scrolled.

In various embodiments, one or more boundaries may be associated with the freeze/thaw attribute such that one or more portions of a file may be frozen or thawed. A portion of a file that is frozen is not modified when the corresponding portion of the file is edited in another multicast window. In some embodiments, when a portion of a displayed file is frozen, a frozen file is created, and associated with the window from which the freeze was activated. In various embodiments, the frozen portions of the frozen file are not contiguous. In some embodiments, a user may designate boundaries by specifying start and end points or high-lighting the portion of the file of interest. Alternately, the boundaries are designated by default to that portion of the file which is visible in the scrollable area of a window. The user then activates a freeze, or alternately a thaw button, to set the desired attribute for the portion of the file associated with the designated boundaries. In some embodiments, tags are inserted at the start and end of the portion of the frozen file which is associated with the designated boundaries to indicate that the portion of the file between the tags has the attribute, either frozen or thawed, set. In other embodiments, boundary information comprising the start and end of the boundary for the associated freeze/thaw attribute is stored in the multicast data structure. When all portions of the frozen file are thawed, the multicast window is associated with the intermediate file and the frozen file is deleted.

Figure 15:
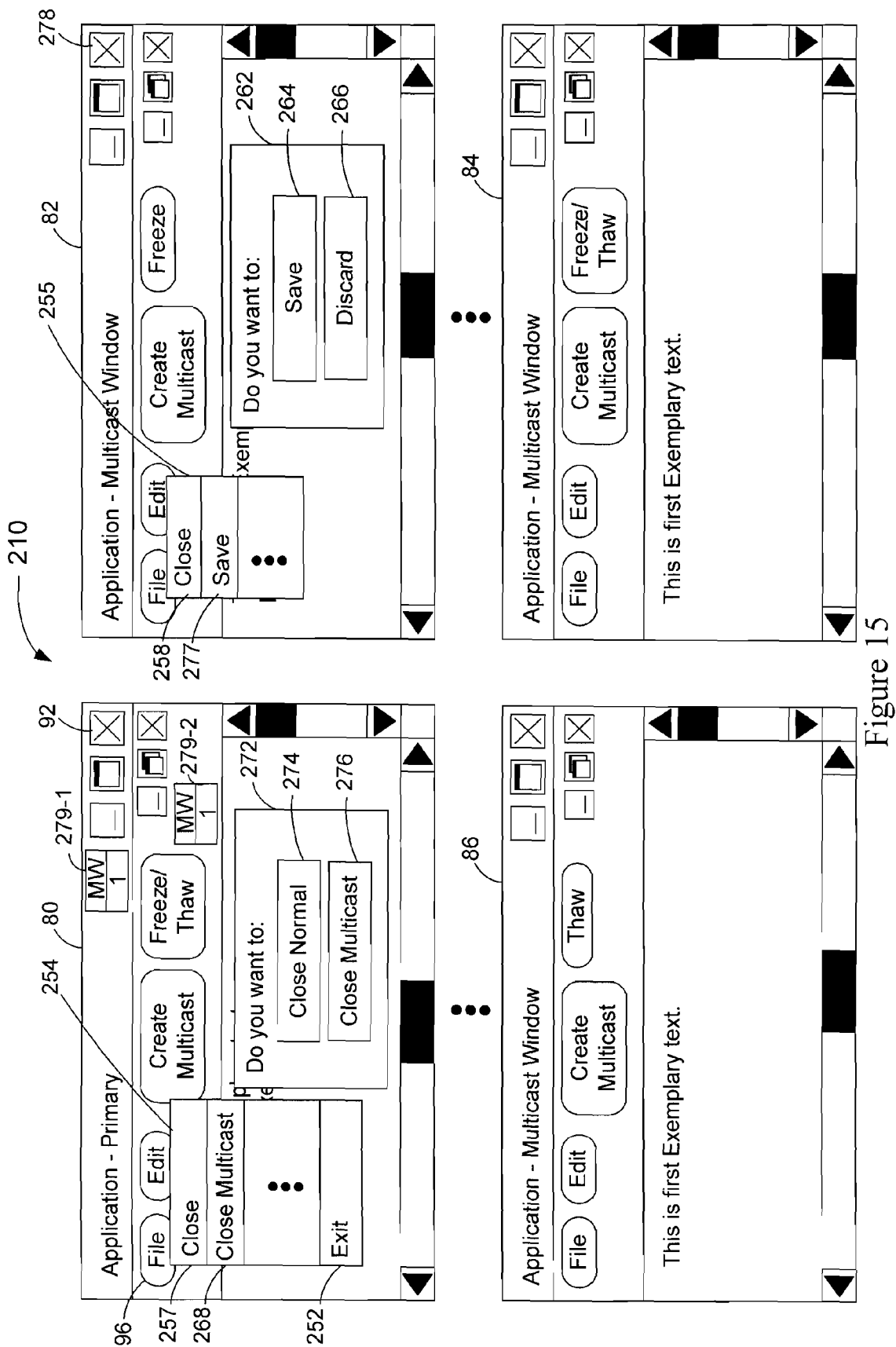
FIG. 15 depicts a diagram of an embodiment of a multicast window set illustrating various embodiments of closing one or more multicast windows.

FIG. 15 depicts a diagram of an embodiment of the multicast window set 210 illustrating various embodiments of closing one or more multicast windows. A multicast window remains on the display until either the application is closed or until the multicast window is closed. In some embodiments, the application is closed from the primary window 80 by, for example, clicking on the close icon 92 or selecting the "Exit" menu item 252 from the file menu 254. The file menu 254 is displayed when a user clicks on the file button 96. In various embodiments, the close of the application results in the removal of the multicast window set 210, and any other windows associated with the application, from the display, and all open files associated with the application are closed.

In another embodiment, selecting "Close" 257 or 258 from the "file" menu 254 or 255 in any multicast window 80 or 82, respectively, results in the removal of the adjunct multicast windows from the display, and closes the source file. In some embodiments, if the displayed file was modified, the user is additionally prompted, via a dialog box 262, during the close operation to indicate whether or not the changes made during the current session are to be retained or discarded by clicking on either a save button 264 or a discard button 266, respectively. In response to the user clicking on the save button 264, the intermediate file 72 (FIG. 1) is copied to the source file 52 (FIG. 1) and the intermediate file 72 (FIG. 1) is deleted. In response to the user clicking on the discard button 266, the intermediate file 72 (FIG. 1) is deleted, and the source file is not modified.

In various embodiments, which will be described in further detail below, the file menu 254 comprises a close multicast menu selection item 268. In some embodiments, when the close icon 92 is clicked on in the primary multicast window, the close-multicast dialog box 272 is displayed. The close-multicast dialog box comprises a close normal button 274 and a close multicast button 276.

In some embodiments, a save menu item 277 may be selected from a file menu 255 in any multicast window to store the intermediate file in the source file.

In various embodiments, individual adjunct multicast windows of a multicast window set may also be closed, while leaving the application and remaining windows intact. In these embodiments, the operation to close the adjunct window is invoked by clicking the window close icon 278 of the adjunct multicast window 82. The adjunct multicast window is removed from the display in a manner transparent to the application and the remaining multicast windows are left intact. In various embodiments, an adjunct icon, 279-1 in the title bar or 279-2 in the tool bar, that represents the removed multicast window, is displayed in the primary multicast window 80.

Figure 16:
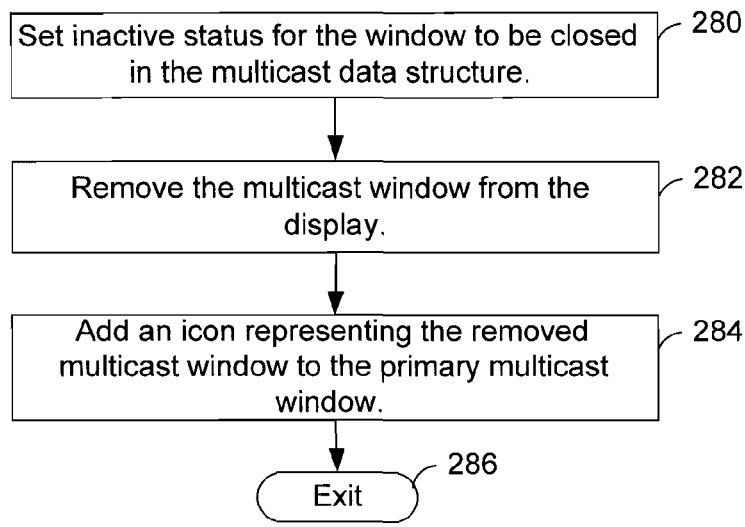
FIG. 16 depicts a flowchart of an embodiment of closing an individual multicast window.

FIG. 16 depicts a flowchart of an embodiment of closing an individual multicast window. In some embodiments, the flowchart of FIG. 16 is implemented in the close adjunct handler 61 of FIG. 1. In various embodiments, the close adjunct handler 61 (FIG. 1) is invoked in response to clicking on the window close icon 278 of an adjunct multicast window. In step 280, the active/inactive field 138 (FIG. 3) in the multicast data structure 74 (FIG. 3) is set to inactive for the multicast window based on the window identifier for that multicast window. In step 282, the multicast window is removed from the display. In step 284, an icon representing the removed multicast window, the adjunct icon, 279-1 or 279-2 (FIG. 15), is added to the primary multicast window in the title bar 87 (FIG. 15) or toolbar 94 (FIG. 15), respectively. In step 286, the close adjunct handler 61 (FIG. 1) exits.

In other embodiments, step 286 is omitted. Alternately, step 280 deletes the information associated with the multicast window from the multicast data structure 74 (FIG. 3).

In various embodiments, when a user clicks on the adjunct icon in the primary multicast window, the associated adjunct multicast window is restored and the active/inactive field in the multicast data structure for that multicast window is set to active. The information in the multicast data structure 74 (FIG. 3) is used to restore the adjunct multicast window.

In other embodiments, a user may close the source file. Selecting the "Close" menu item 257 or 258 (FIG. 15) from the "file" menu 254 or 255, (FIG. 15) in any multicast window 80 and 82 (FIG. 15), respectively, results in the removal of the multicast windows from the display, and closes the source file.

Figure 17:
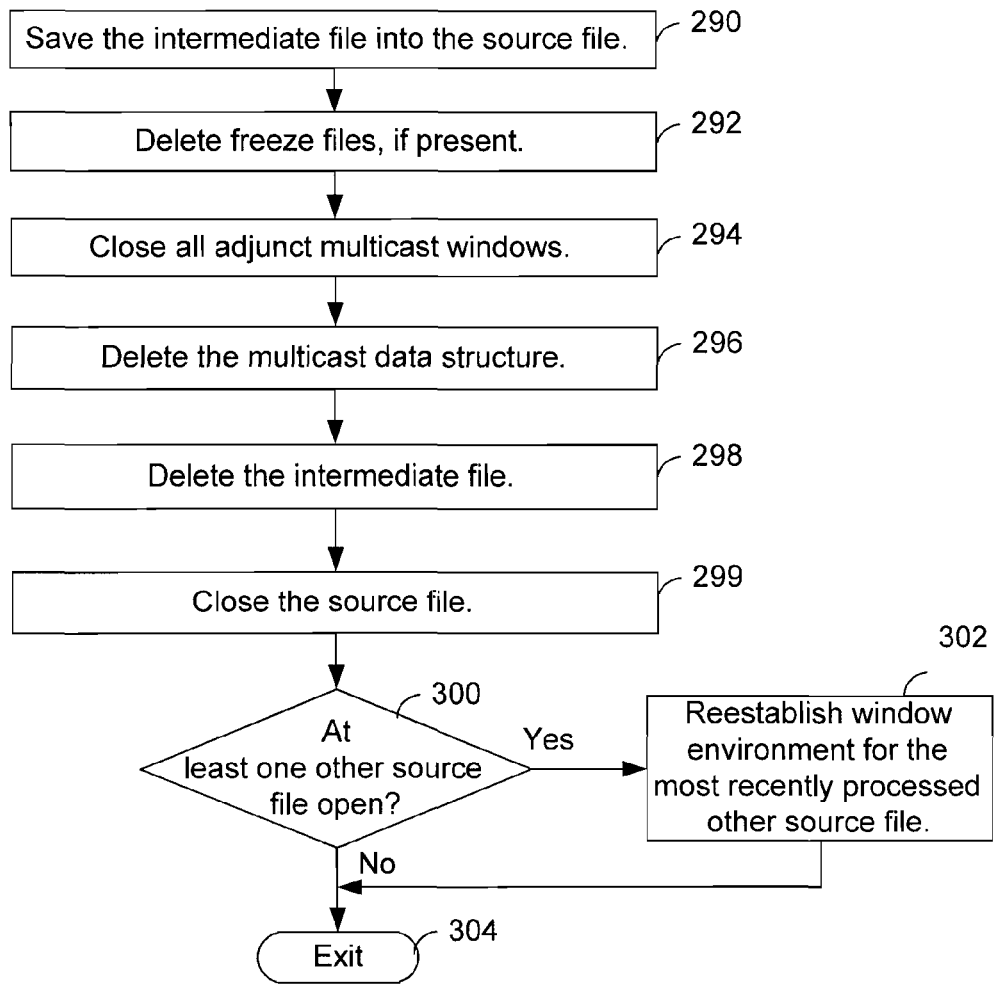
FIG. 17 depicts a flowchart of an embodiment of closing the source file.

FIG. 17 depicts a flowchart of an embodiment of closing the source file. In some embodiments, the flowchart of FIG. 17 is implemented in the close normal handler 62 of FIG. 1. In various embodiments, the close normal handler 62 (FIG. 1) is invoked in response to exiting the application or selecting the close menu item, 257 and 258 of FIG. 15.

In step 290, the intermediate file, without the multicast data structure, is saved into the source file. In step 292, the freeze files are deleted, if present. In step 294, all adjunct multicast windows are closed, that is removed from the display. In various embodiments, the multicast windows are identified from the multicast data structure. In step 296, the multicast data structure is deleted. In step 298, the intermediate file is deleted. In step 299, the source file is closed. The source file is no longer displayed in the primary multicast window. Step 300 determines whether at least one other source file is open. When at least one other source file is open, in step 302, the window environment for the most recently processed other source file is reestablished. In step 304, the close normal handler 62 (FIG. 1) exits. When step 300 determines that no other source files are open, step 300 proceeds to step 304 to exit.

Figure 18:
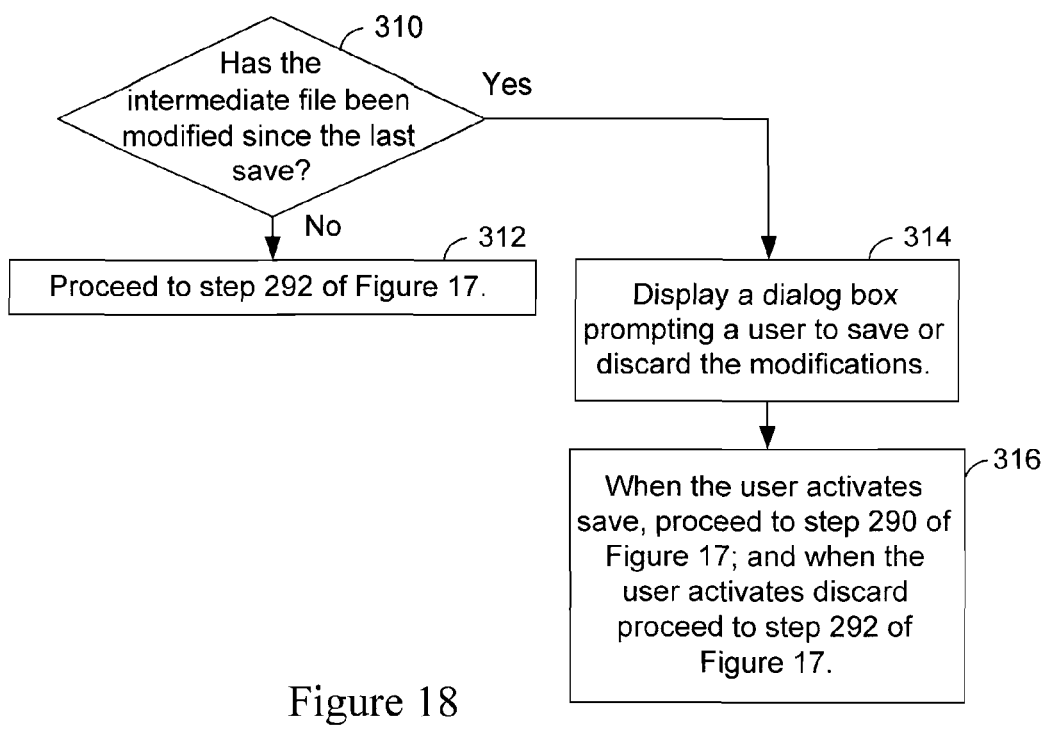
FIG. 18 depicts a flowchart of an embodiment of prompting the user with a dialog box when closing a source file.

FIG. 18 depicts a flowchart of an embodiment of prompting the user with a dialog box when closing a source file. The flowchart of FIG. 18 works with the flowchart of FIG. 17. In various embodiments, the close normal handler 62 implements the flowcharts of FIGS. 17 and 18. Step 310 determines if the intermediate file has been modified since the last save operation. If not, step 312 proceeds to step 292 of FIG. 17. When the intermediate file has been modified since the last save operation, in step 314, the dialog box 262 (FIG. 15) is displayed prompting the user to save or discard the modifications by clicking on either a save button 264 (FIG. 15) or a discard button 266 (FIG. 15), respectively. In step 316, when the user activates the save button 264 (FIG. 15), step 316 proceeds to step 290 of FIG. 17; and when the user activates the discard button 266 (FIG. 15), step 316 proceeds to step 292 of FIG. 17.

In some embodiments, there is another type of the close operation referred to as "Close Multicast." As shown in FIG. 15, in the primary multicast window, the close multicast menu item 268 is displayed when the file button 96 is clicked on. In other embodiments, when the close icon 92 is clicked on, the close-multicast dialog box 272 containing the close normal button 274 and the close multicast button 276 is displayed.

In various embodiments, activating the close normal button 274 (FIG. 15) performs the close operation described above, and invokes the close normal handler 62 (FIG. 1). The normal close operation does not retain any document positioning information for any of the multicast windows comprising the multicast window set. The first subsequent "Open" operation following a "Close Normal" operation results in opening only the primary multicast window, with the document positioned to the start of the file in the scrollable area. In various embodiments, the flowcharts of FIGS. 17 and 18 perform the "Close Normal" operation.

In contrast, in various embodiments, the "Close Multicast" operation retains positioning information for each multicast window within the multicast window set. The "Close Multicast" operation provides for closing the source file with the capability of opening the source file at a later time with the source file being displayed just as it was before the most recent close operation. In various embodiments, the first "Open" operation following a "Close Multicast" operation for a source file results in displaying the entire multicast window set with each multicast window displaying the subsets of the source file that were displayed when the "Close Multicast" operation was invoked. In some embodiments, the freeze/thaw attribute and associated freeze file for any frozen windows are retained, and subsequently restored.

Figure 19:
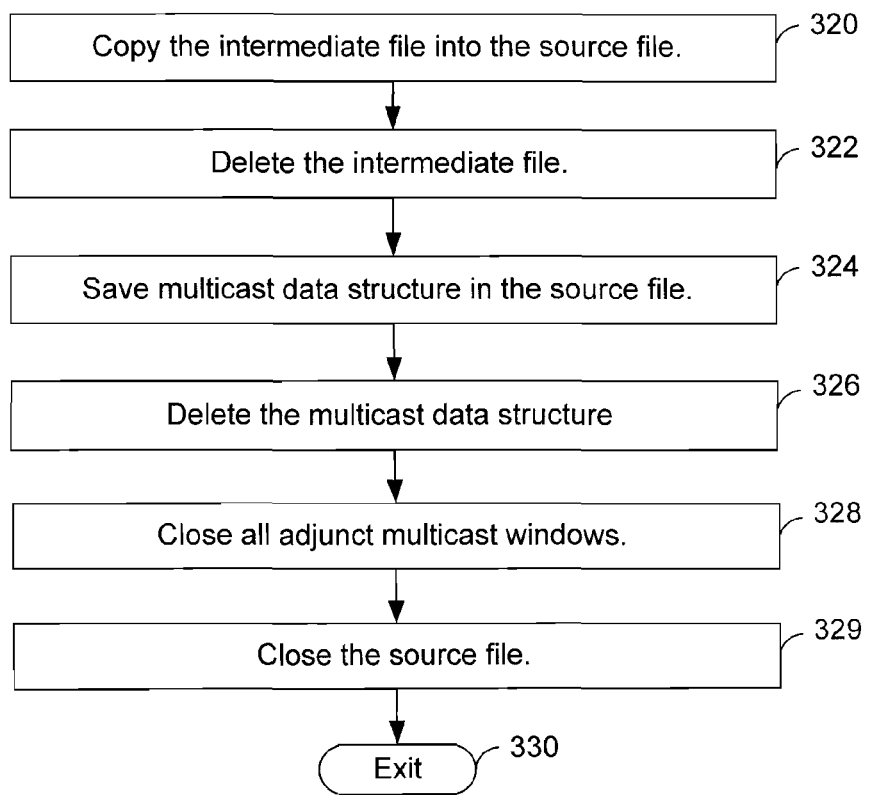
FIG. 19 depicts a flowchart of an embodiment of closing a multicast window set using a close multicast function.

FIG. 19 depicts a flowchart of an embodiment of closing a multicast window set and saving state information about the multicast window set such that, when re-opened, the multicast window set can be restored. In some embodiments, the flowchart of FIG. 19 is implemented in the close multicast handler 64 of FIG. 1. In various embodiments, clicking on the "Close Multicast" button 276 (FIG. 15) or selecting the close multicast menu item 268 (FIG. 15) invokes the close multicast handler 64 of FIG. 1. In step 320, the intermediate file is copied into the source file. In step 322, the intermediate file is deleted. In step 324, the multicast data structure is saved in the source file. In step 326, the multicast data structure is deleted. In step 328, all adjunct multicast windows associated with the multicast window set are closed. In step 329, the source file is closed, and is no longer displayed in the primary multicast window. In step 330, the close multicast handler exits. In various embodiments, any freeze files that were associated with the multicast window set are retained.

Figure 20:
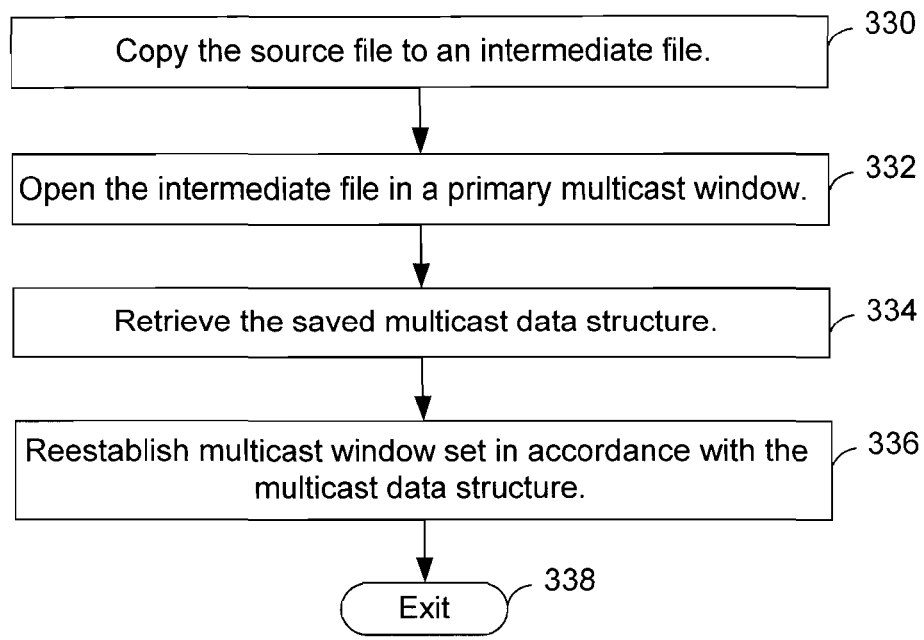
FIG. 20 depicts a flowchart of an embodiment of opening a source file that has been closed using the close multicast function.

FIG. 20 depicts a flowchart of an embodiment of opening a source file that has been closed using the close multicast function. In step 330, the source file is copied into an intermediate file. In step 332, the intermediate file is opened in the primary multicast window. In step 334, the saved multicast data structure is retrieved. In step 336, the multicast window set is reestablished in accordance with the multicast data structure. In step 338, the flowchart exits.

Figure 21:
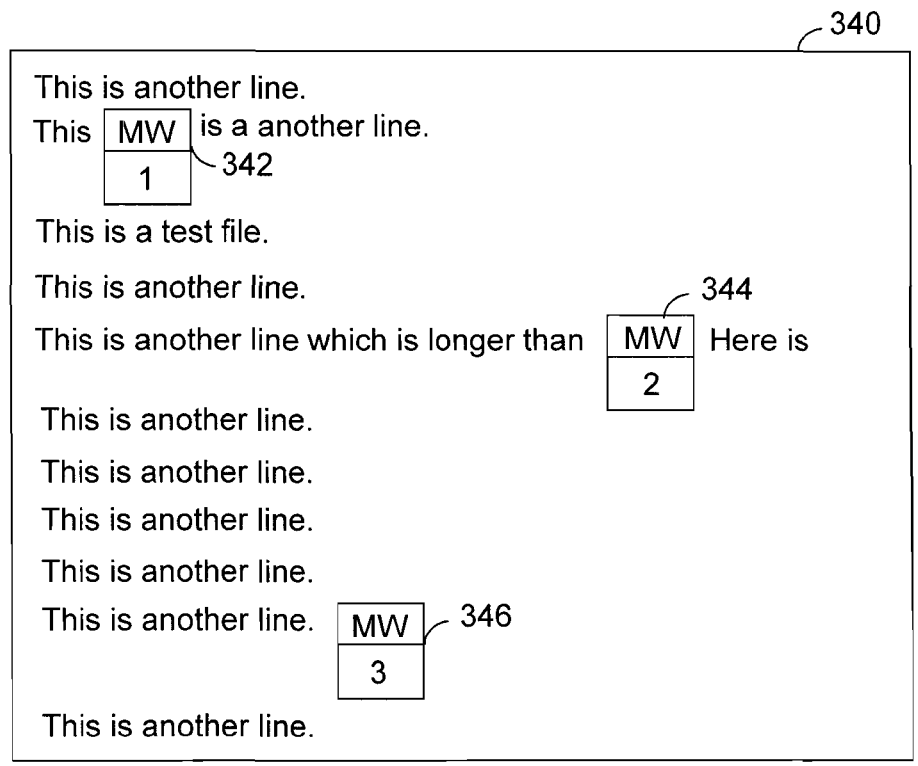
FIG. 21 depicts an illustrative file comprising multicast window indicator icons representing removed adjunct multicast windows.

FIG. 21 depicts an illustrative file 340 comprising multicast window indicator icons 342, 344 and 346, representing removed adjunct multicast windows. In FIG. 21, the multicast window indicator icons, 342, 344 and 346, are not scaled with respect to the size of the font; typically the height of a multicast window indicator icon, 342, 344 and 346, is the same as the font. In various embodiments, the multicast window indicator icons, 342, 344 and 346, have a distinct indicator, for example, the label "MW." In some embodiments, the multicast window indicator icons have a distinct identifier representing the associated adjunct multicast window that was removed, for example, a number indicating the sequence of removal of the adjunct multicast window.

In various alternate embodiments of the closing of the multicast window set of FIG. 19, in step 324, one or more multicast window indicators and positioning tags are stored within the source file 52 (FIG. 1), such that the multicast windows and position of the file displayed within a scrollable area of each of the multicast windows may later be reestablished. In some alternate embodiments, a multicast window indicator icon, 342, 344 or 346 (FIG. 21), is generated based on the multicast window indicator and associated positioning tag, and the multicast window indicator icon, 342, 344 or 346 (FIG. 21), is inserted into the source file at the starting position indicated by the positioning indicator tag. Therefore, the source file may contain a plurality of multicast window indicator icons, 342, 344 or 346 (FIG. 21). In some embodiments, multicast windows are individually reestablished as the user scrolls the source file in the multicast window by clicking on a multicast window indicator icon, 342, 344 or 346 (FIG. 21). The multicast window indicator and positioning tag are inserted into the source file for each multicast window of the multicast window set to facilitate processing of a subsequent open operation wherein the previous multicast window set and corresponding positioning of the displayed information of the intermediate file is reestablished. In various embodiments, the multicast window indicator and positioning tag are implemented as hidden characters. In some embodiments, the multicast window indicator and positioning tag are implemented as XML tags. In various embodiments, a multicast window indicator icon, 342, 344 or 346 (FIG. 21), is generated and inserted into the source file for each multicast window indicator. In some embodiments, the multicast window indicator icons, 342, 344 or 346 (FIG. 21), are positioned at the starting location of the information that was displayed in a multicast window when the close multicast function was activated. In some of these alternate embodiments, step 324, saving the multicast data structure, is omitted.

In an alternate embodiment of opening the multicast window set of the flowchart of FIG. 20, the multicast data structure is not used. In some embodiments, in step 334 of FIG. 20, the open multicast window handler 68 (FIG. 1) reads the intermediate file and when a multicast positioning tag, or alternately, a multicast window indicator icon, 342, 344 or 346 (FIG. 21), is encountered, opens a multicast window to display the section of the file starting at the multicast positioning tag. The intermediate file is displayed in the primary multicast window at the first multicast positioning tag encountered in the source file. When a subsequent multicast positioning tag, or alternately, a multicast window indicator icon, 342, 344 or 346 (FIG. 21), is encountered, a new multicast window is opened to display the information of the intermediate file at the subsequent multicast positioning tag. In this alternate embodiment, step 336 of FIG. 20 is omitted.

In another alternate embodiment, when a multicast window indicator icon, 342, 344 or 346, becomes visible in the scrollable area of the primary window, the associated multicast window is automatically displayed.

A user may close the application by clicking on the close icon 92 (FIG. 15) or by selecting the exit menu item 252 (FIG. 15) of the primary multicast window. In various embodiments, clicking on the close icon 92 (FIG. 15) or selecting the exit menu item 252 (FIG. 15) invokes the exit handler 71 of FIG. 1. In some embodiments, the exit handler 71 (FIG. 1) invokes the close normal handler, closes any open source files, then closes the application. In other embodiments, the exit handler displays the dialog box 272 (FIG. 15) to prompt the user to select a close normal or a close multicast operation, perform the selected close operation, closes any open source files, and closes the application.

In some embodiments, the multicast functionality described herein may transparently span different applications deploying the multicast technology and operating upon a common supported file type. Typically, the multicast functionality of a multicast window set is associated with a single application. In other embodiments, the multicast functionality of the multicast windows of the multicast window set may use at least two different applications.

The foregoing description of the preferred embodiments of the inventions has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended thereto.

What is claimed is:

1. A computer-implemented method, comprising:
    displaying, by an application, a portion of a unit of information in a first window on a display, and another portion of said unit of information in a second window on said display, wherein said first window and said second window are concurrently displayed on said display;
    closing, by said application, said second window on said display, wherein said closing inserts an indicator representing said second window into said unit of information and removes said second window from said display, wherein said unit of information does not comprise said indicator prior to said closing; and
    in response to an interaction involving said indicator, redisplaying, by said application, said another portion of said unit of information in a third window on said display, wherein said first window and said third window are concurrently displayed on said display, wherein, prior to said redisplaying, said indicator is displayed in said first window.

2. The method of claim 1, wherein said interaction involving said indicator is a user activation of said indicator.

3. The method of claim 1, wherein said interaction involving said indicator is an interaction that causes said indicator to be displayed in said first window.

4. The method of claim 1, wherein said indicator is an icon.

5. The method of claim 1, wherein said interaction involving said indicator is an activation of said indicator.

6. The method of claim 1, wherein said unit of information is a file.

7. The method of claim 1, wherein said application is an editor.

8. The method of claim 1, wherein said unit of information has a start position tag at a starting location of said another portion in said unit of information, wherein said unit of information includes said indicator at said starting location of said another portion in said unit of information.

9. The method of claim 1, wherein said indicator is displayed in said first window at a start of said another portion of said unit of information.

10. A computer-readable storage medium having computer readable program code embodied therewith, said computer-readable program code being executable by a processor, said computer readable program code comprising:
   computer readable program code executable by said processor to cause said processor to display, by an application, a portion of a unit of information in a first window on a display, and another portion of said unit of information in a second window on said display, wherein said first window and said second window are concurrently displayed on said display;
   computer readable program code executable by said processor to cause said processor to close, by said application, said second window on said display, wherein said close inserts an indicator representing said second window into said unit of information and removes said second window from said display, wherein said unit of information does not comprise said indicator prior to said close; and
   computer readable program code executable by said processor to cause said processor to, in response to an interaction involving said indicator, redisplay, by said application, said another portion of said unit of information in a third window on said display, wherein said first window and said third window are concurrently displayed on said display, wherein, prior to said redisplay, said indicator is displayed in said first window.

11. The computer readable-storage medium of claim 10, wherein said interaction involving said indicator is a user activation of said indicator.

12. The computer readable-storage medium of claim 10, wherein said interaction involving said indicator is an interaction that causes said indicator to be displayed in said first window.

13. The computer-readable storage medium of claim 10, wherein said indicator is displayed in said first window at a start of said another portion of said unit of information.

14. The computer-readable storage medium of claim 10, wherein said interaction involving said indicator is an activation of said indicator.

15. The computer-readable storage medium of claim 10, wherein said unit of information has a start position tag at a starting location of said another portion in said unit of information, wherein said unit of information includes said indicator at said starting location of said another portion in said unit of information.

16. An apparatus, comprising:
   a processor; and
   a memory storing instructions that:
      display, by an application, a portion of a unit of information in a first window on a display, and another portion of said unit of information in a second window on said display, wherein said first window and said second window are concurrently displayed on said display;
      close, by said application, said second window on said display, wherein said close inserts an indicator representing said second window into said unit of information and removes said second window from said display, wherein said unit of information does not comprise said indicator prior to said close; and
      in response to an interaction involving said indicator, redisplay, by said application, said another portion of said unit of information in a third window on said display, wherein said first window and said third window are concurrently displayed on said display, wherein, prior to said redisplay, said indicator is displayed in said first window.

17. The apparatus of claim 16, wherein said interaction involving said indicator is a user activation of said indicator.

18. The apparatus of claim 16, wherein said interaction involving said indicator is an interaction that causes said indicator to be displayed in said first window.

19. The apparatus of claim 16, wherein said indicator is displayed in said first window at a start of said another portion of said unit of information.

20. The apparatus of claim 16, wherein said interaction involving said indicator is an activation of said indicator.

* * * * *